United States Patent
Maeda

(10) Patent No.: US 7,720,875 B2
(45) Date of Patent: May 18, 2010

(54) INFORMATION PROCESSING APPARATUS, IMAGE PROCESSING APPARATUS, DATA CONVERSION METHOD, AND COMPUTER-READABLE MEDIUM STORING DATA CONVERSION PROGRAM

(75) Inventor: Shunichi Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 391 days.

(21) Appl. No.: 11/868,063

(22) Filed: Oct. 5, 2007

(65) Prior Publication Data

US 2008/0086492 A1   Apr. 10, 2008

(30) Foreign Application Priority Data

Oct. 6, 2006   (JP) .............................. 2006-275309

(51) Int. Cl.
*G06F 17/30* (2006.01)
(52) U.S. Cl. ...................................... 707/802; 707/760
(58) Field of Classification Search ...................... 707/4, 707/100
See application file for complete search history.

(56) References Cited

U.S. PATENT DOCUMENTS 5,339,434 A * 8/1994 Rusis .......................... 709/246
7,272,821 B2 * 9/2007 Chittar et al. ................ 717/116

FOREIGN PATENT DOCUMENTS

| JP | 2003-333241 | 11/2003 |
|---|---|---|
| JP | 2004-274486 | 9/2004 |
| JP | 2005-251120 | 9/2005 |

\* cited by examiner

*Primary Examiner*—Cheryl Lewis
(74) *Attorney, Agent, or Firm*—Oblon, Spivak, McClelland, Maier & Neustadt, L.L.P.

(57) ABSTRACT

An information processing apparatus is disclosed that includes a system acquisition data conversion unit that converts system acquisition data acquired as information for use by one or more applications installed in the information processing apparatus into universal data, and an application usable data conversion unit that converts the universal data into application usable data usable by the one or more applications. The universal data are independent of the data structure of the system acquisition data and the data structure of the application usable data.

12 Claims, 33 Drawing Sheets

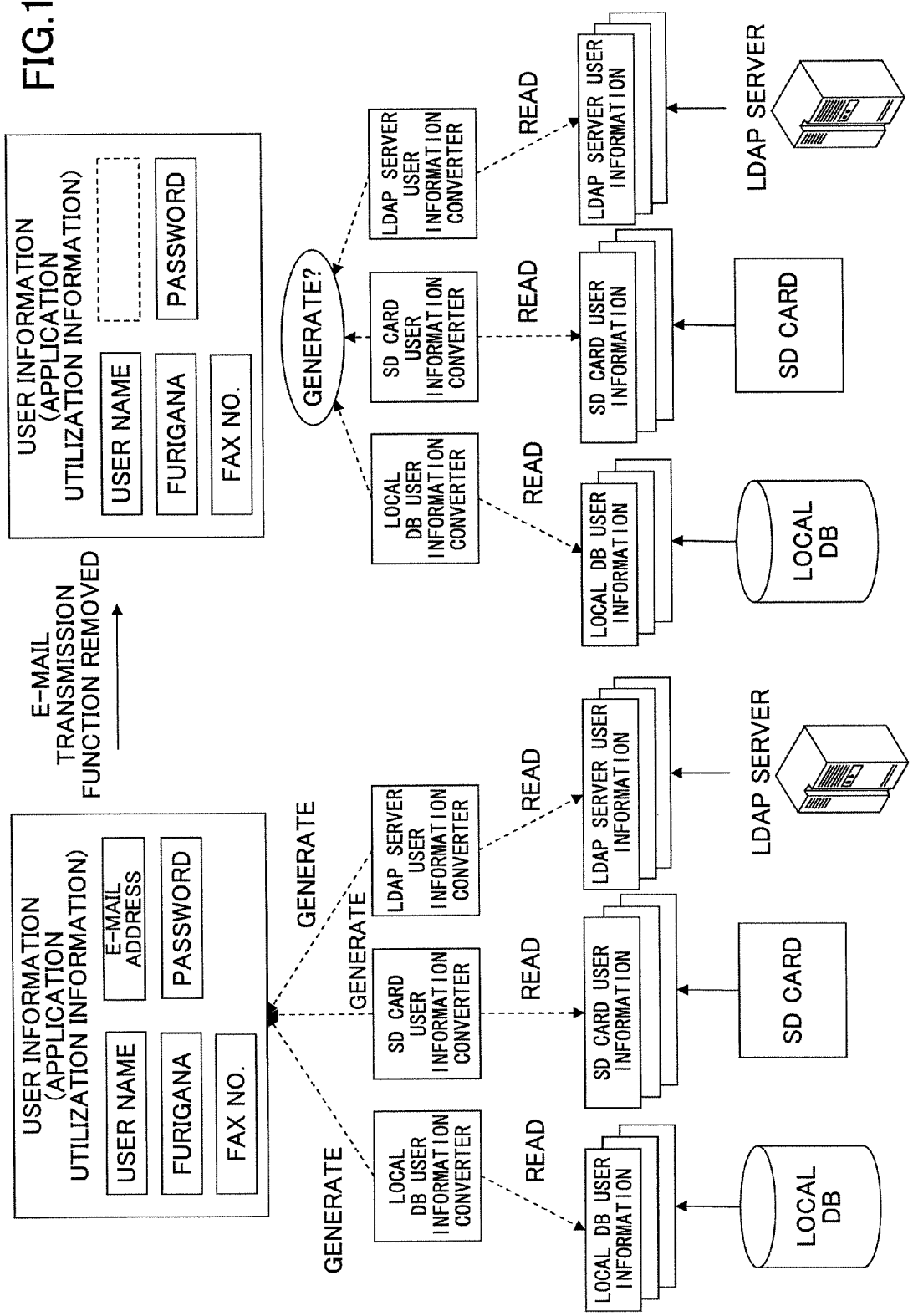

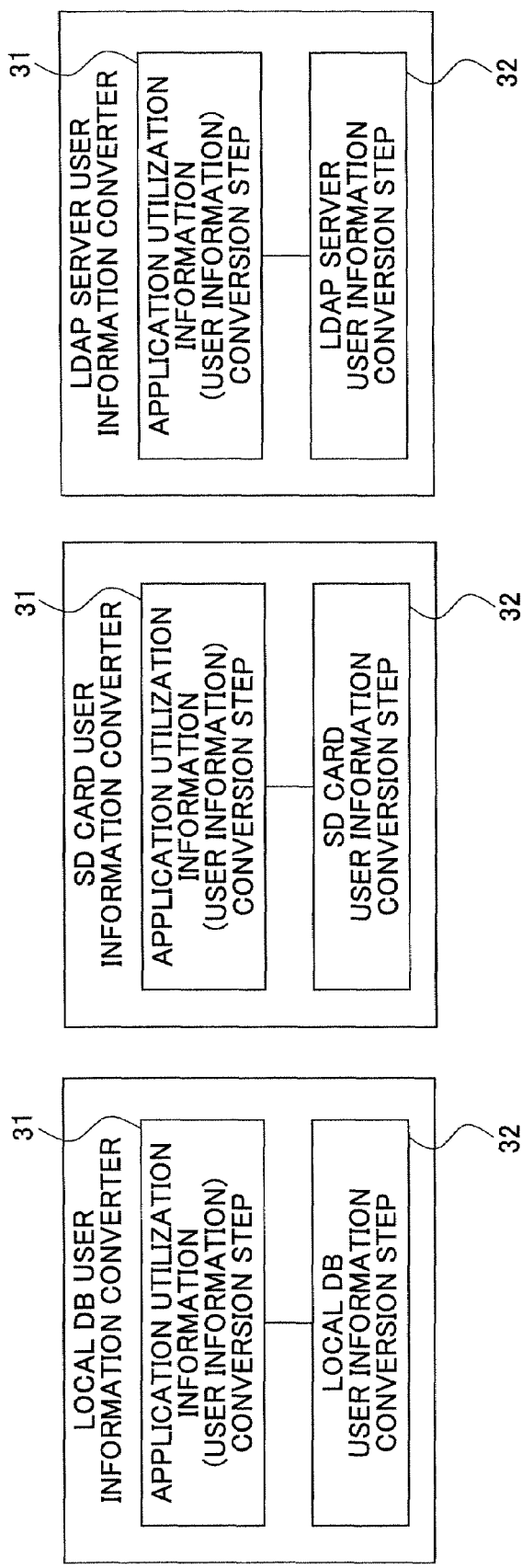

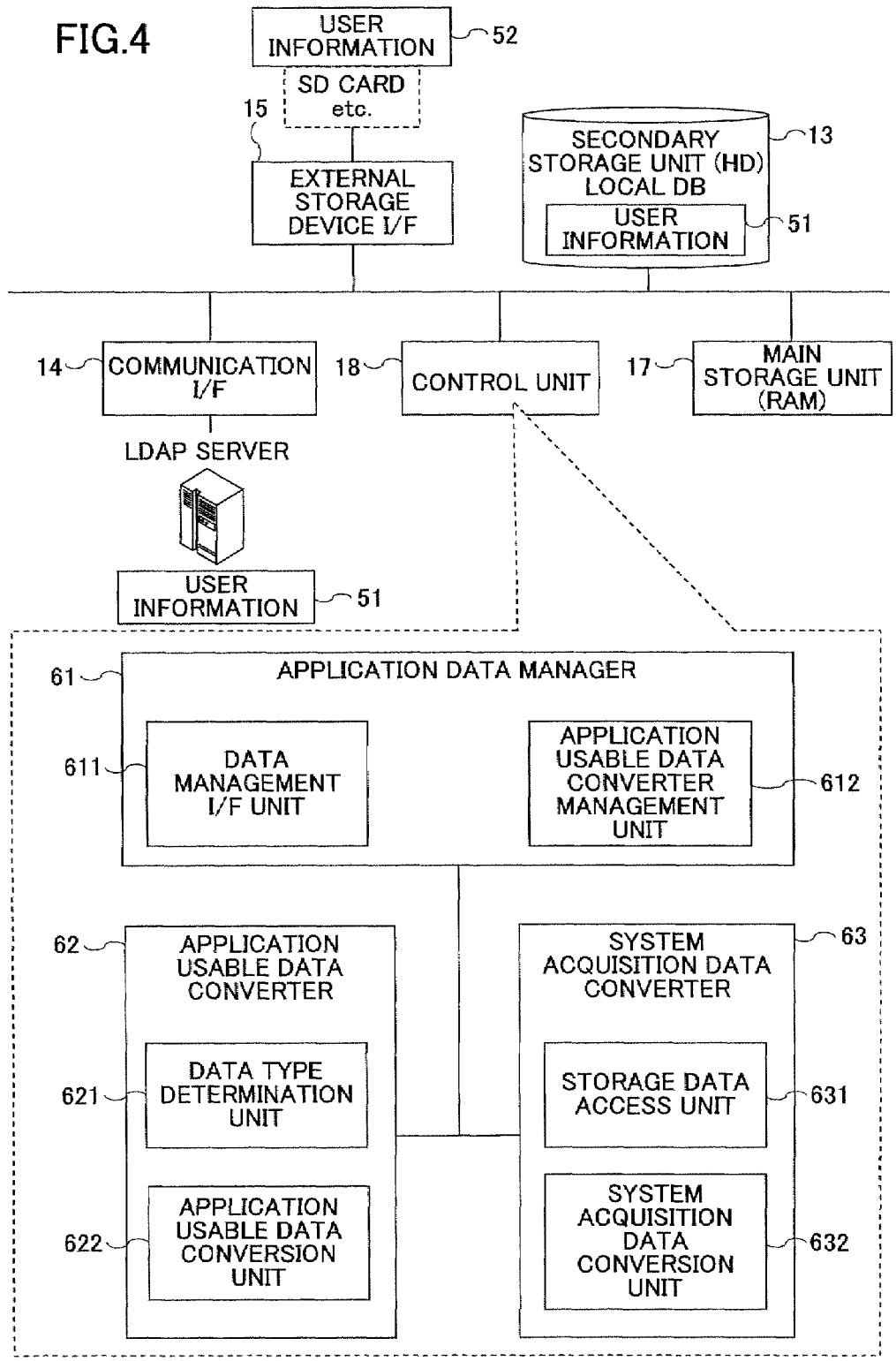

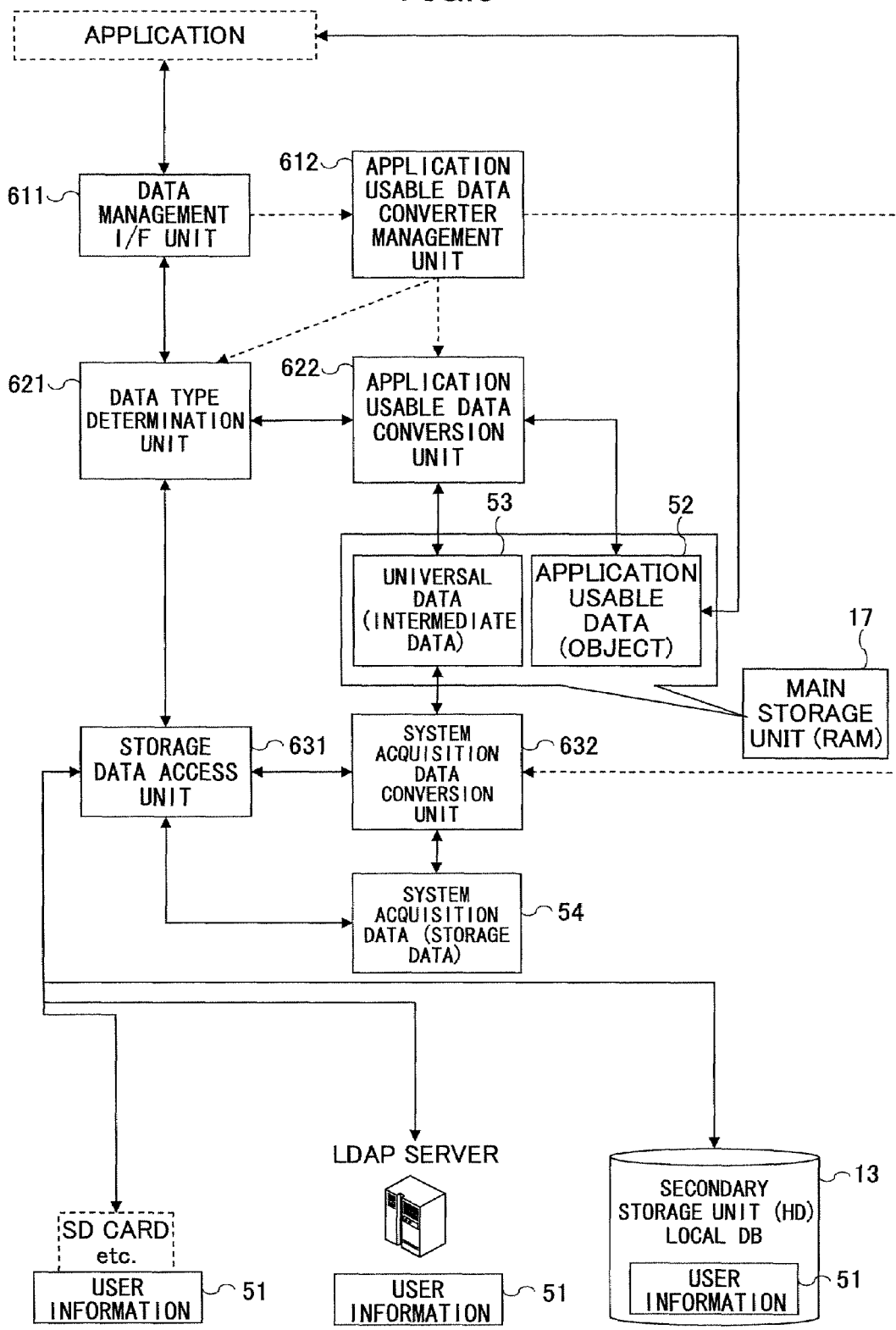

INFORMATION PROCESSING APPARATUS, IMAGE PROCESSING APPARATUS, DATA CONVERSION METHOD, AND COMPUTER-READABLE MEDIUM STORING DATA CONVERSION PROGRAM

BACKGROUND OF THE INVENTION

1. Field of the Invention

The present invention relates to an information processing apparatus including a data interface between a system and an application.

2. Description of the Related Art

FA equipment and OA equipment are often used in complex system environments, raising issues related to procedures and formats for exchanging data. It is therefore important to study a data flow before constructing a system. However, even if careful study is made prior to system construction, systems today face rapid environment changes after being installed and often require installation of devices with new data interfaces (I/Fs).

In view of the foregoing, Japanese Patent Application Laid-Open Publication No. 2005-251120 (Patent Document 1) discloses an FA equipment I/F integrating device capable of facilitating update of an I/F upon introduction of new FA equipment or upon software upgrade.

Information processing apparatuses used in such a system environment not only handle complex data but also employ complex procedures and formats for exchanging the data between programs after loading the data through a data I/F. Similarly, procedures and formats used by an image processing apparatus for exchanging loaded data between programs are becoming complex.

Image processing apparatuses today have multiple functions such as printer, copier, facsimile and scanner functions, and include a control unit, a display unit, a printing unit and a scanner unit integrated in a single casing. Such an image processing apparatus realizes printer, copier, facsimile and scanner functions through execution of corresponding function programs by a control unit.

These functions of the image processing apparatuses use various types of information such as, for example, user information. User information may include user specific data such as user name, authentication password, mail address for use by the scanner function of the image processing apparatus, and facsimile number for use by the facsimile function of the image processing apparatus (For a method of managing user information in an image processing apparatus, see Japanese Registered Patent No. 3715629, for example).

The image processing apparatuses acquire various types of data (such as user information) in different formats from information (data) storage locations present in the environment surrounding the image processing apparatuses according to respective data access methods. Examples of a storage location include a local database (DB) in the hard disk (HD) of the image processing apparatus, an SD card (Secure Digital memory card) as an external storage medium, and an LDAP (Lightweight Directory Access Protocol) server connected via a network (for an information processing apparatus using information acquired from an LDAP server, see Japanese Patent Application Laid-Open Publication NO. 2004-274486, for example).

As one method for facilitating data management upon adding a new function (i.e. upon installing a new application) or upon being connected to a new storage location, a data format and a data access procedure used in the image processing apparatus may be integrated into one module as a data conversion rule by using the technique disclosed in Patent Document 1. The data conversion rule defines conversion between a data structure of system acquisition data acquired by the image processing apparatus and a data structure of application usable data (e.g. user information) usable by various function applications.

This method, however, has the following problems.

For example, with reference to FIG. 1, the user information used in the image processing apparatus includes data items acquired from plural storage locations such as a local DB, an SD card and an LDAP server. This user information is generated by using data conversion modules each having a function for converting a data structure of the corresponding data item into a data structure usable by applications according to the data format and the data access method handled by the corresponding storage location and the data structure of the user information. However, if an application for an e-mail transmission function is removed from the image processing apparatus, the data structure of the user information is changed to exclude the e-mail address. With this change, the data structure of the user information becomes different from one that is known to data converters, resulting in an error when the data converters generate the user information.

This method is highly dependent on the data structure and therefore has the following disadvantage. If the data structure of the application usable data is changed due to installation or uninstallation of an application or the like, since it is not clear which part of the data conversion module is dependent on the data structure and which part is not (i.e., since the part dependent on the data structure and the part independent of the data structure are not clearly separated from each other), the data structure change affects a great part of the data conversion function (i.e. a data I/F function), requiring changes therein. The same applies to the case where the data structure of the system acquisition data is changed by the storage location. These factors make it troublesome to develop and introduce a new extension function that uses a new data structure.

SUMMARY OF THE INVENTION

In view of the forgoing, the present invention is directed to provide an information processing apparatus, an image processing apparatus, a data conversion method, and a computer-readable medium storing a data conversion program that can easily respond to a data structure change between data (system acquisition data) that are acquired by a system as application utilization information and data (application usable data) that can be used by an application.

According to an aspect of the present invention, there is provided an information processing apparatus that includes a system acquisition data conversion unit that converts system acquisition data acquired as information for use by one or more applications installed in the information processing apparatus into universal data independent of a data structure of the system acquisition data and a data structure of application usable data, the application usable data being usable by said one or more applications; and an application usable data conversion unit that converts the universal data into the application usable data.

According to another aspect of the present invention, there is provided a data conversion method that includes a system acquisition data converting step of converting system acquisition data acquired as information for use by an application into universal data independent of a data structure of the system acquisition data and a data structure of application usable data, the application usable data being usable by the application; and an application usable data converting step of converting the universal data into the application usable data.

According to still another aspect of the present invention, there is provided a computer-readable medium storing a data conversion program for causing a computer to function as a system acquisition data conversion unit that converts system acquisition data acquired as information for use by an application into universal data independent of a data structure of the system acquisition data and a data structure of application usable data, the application usable data being usable by the application; and an application usable data conversion unit that converts the universal data into the application usable data.

Embodiments of the present invention provide an information processing apparatus, an image processing apparatus, a data conversion method, and a computer-readable medium storing a data conversion program that perform data conversion between data (system acquisition data) that are acquired by a system as application utilization information and data (application usable data) that can be used by an application through the intermediary of universal data independent of the data structures of the application usable data and the system acquisition data, thereby lowering dependency between the data structures of the application usable data and the system acquisition data, and thus can easily respond to a data structure change (upon installing or uninstalling an application, or upon connecting to or disconnecting from a storage location) between the system acquisition data and the application usable data.

BRIEF DESCRIPTION OF THE DRAWINGS

FIG. 1 is a diagram used to describe problems with a related-art information processing apparatus;

FIG. 3 is a diagram used to describe an overview of the first embodiment of the present invention;

FIG. 4 is a diagram showing a configuration example of main function units of the information processing apparatus according to the first embodiment of the present invention;

FIG. 5 is a block diagram showing components of the main function units of the information processing apparatus according to the first embodiment of the present invention;

DETAILED DESCRIPTION OF THE PREFERRED EMBODIMENT

Preferred embodiments of the present invention are described below with reference to the accompanying drawings.

First Embodiment

Example of Hardware Configuration of the Present Embodiment

Figure 2A:
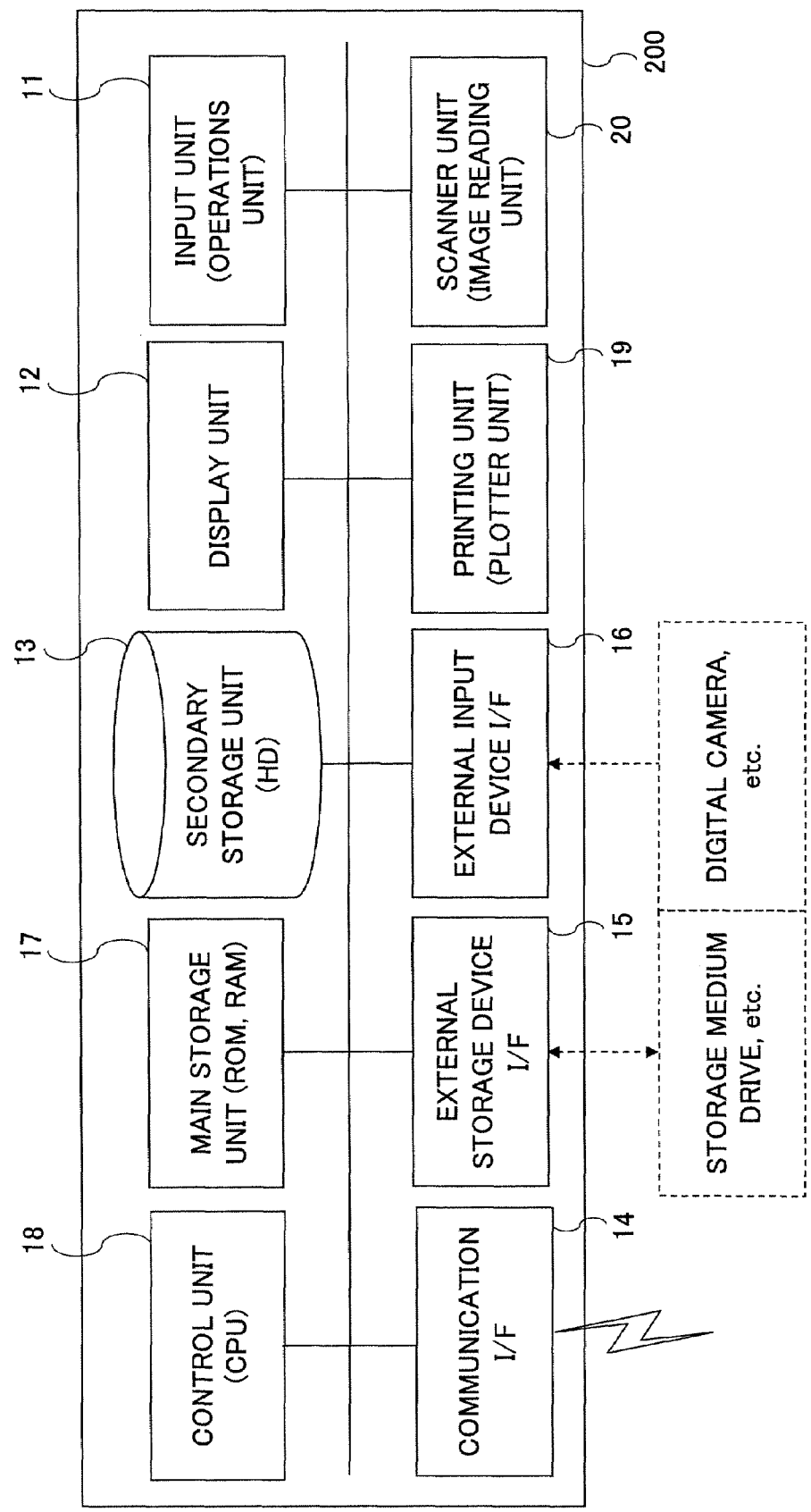
FIG. 2A is a diagram showing an example of a hardware configuration of an image processing apparatus (including an image forming apparatus) according to a first embodiment of the present invention.
Figure 2B:
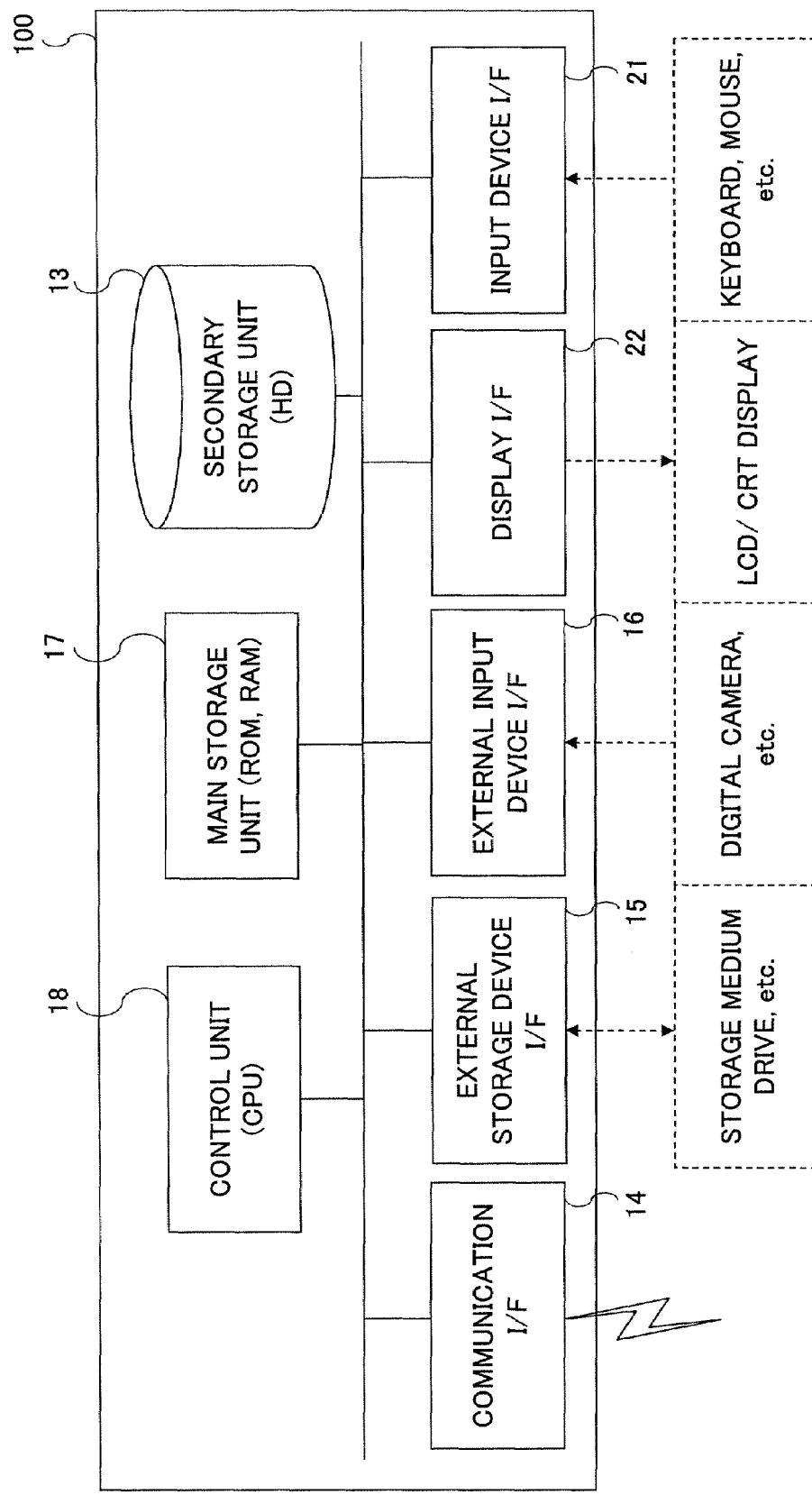
FIG. 2B is a diagram showing an example of a hardware configuration of an information processing apparatus according to the first embodiment of the present invention.

FIGS. 2A and 2B are diagrams showing an example of a hardware configuration of an image processing apparatus 200 and an example of a hardware configuration of an information processing apparatus 100, respectively, according to a first embodiment of the present invention.

Referring to FIG. 2A, the image processing apparatus 200 of this embodiment includes an input unit 11, a display unit 12, a secondary storage unit 13, a communication I/F 14, an external storage device I/F 15, an external input device I/F 16, a main storage unit 17, a control unit 18, a printing unit (plotter unit) 19, and a scanner unit (image reading unit) 20.

The input unit 11 includes plural hard keys, and is configured to receive operation instructions from a user. The display unit 12 includes a touch panel function, and is configured to provide GUIs for a user and display the operational status and job information of the image processing apparatus 200 on the display screen.

The secondary storage unit (HD) 13 has high capacity for holding data handled by the image processing apparatus 200. The communication I/F 14 is an interface with devices connected to the image processing apparatus 200 via a data transmission channel such as a public line and a network.

The external storage device I/F 15 is an interface with an external storage device such as a storage medium drive capable of reading a memory card such as an SD card and the like. The external input device I/F 16 is an interface with an external input device such as a digital camera. The external storage device I/F 15 and the external input device I/F 16 provide data communications between the image processing apparatus 200 and the storage medium drive, etc., and between the image processing apparatus 200 and the digital camera, etc., respectively.

The main storage unit 17 includes a ROM (Read Only Memory) and a RAM (Random Access Memory). The ROM stores basic software (OS (Operating System)) of the image processing apparatus 200, programs and data related to basic function applications (e.g. a copier function, a facsimile function, a scanner function, etc.). The basic software and the basic function applications are loaded from the ROM into the RAM at start-up of the image processing apparatus 200.

The control unit 18 includes a CPU (Central Processing Unit), and provides basic control of functions of the image processing apparatus 200. More specifically, the control unit 18 loads the basic software from the ROM into the RAM at the time of power-on of the image processing apparatus 200. The control unit 18 then loads the basic function applications into the RAM and executes the applications on the basic software, thereby activating the functions of the image processing apparatus 200.

The printing unit (plotter unit) 19 is configured to print images, text, graphics, etc., onto paper based on print data of CMYK components through an electrophotographic process (including exposure, latent image forming, development, and transfer processes) using a laser beam.

The scanner unit (image reading unit) 20 includes a line sensor having CCDs (Charge Coupled Devices), and is configured to scan the original on a contact glass and generate RGB 8-bit digital images. In other words, the scanner unit 20 reads information from the original and converts the information into digital data.

With this configuration, the image processing apparatus 200 provides multiple functions including copier, printer, and facsimile functions.

Information handled by the image processing apparatus 200 includes data used by a single function and data (e.g. user information) shared by multiple functions. This embodiment is directed to solve a problem with a data conversion function (i.e. a data I/F function) for converting data between a system and an application, particularly the data shared by multiple functions, and not the data used by a single function.

Among hardware components of the image processing apparatus 200 shown in FIG. 2A, hardware related to this embodiment of the present invention includes the secondary storage unit 13 and the external storage device I/F 15 for holding information for use by an application (hereinafter referred to as "application utilization information"), the communication I/F 14 for acquiring the application utilization information from a data management server or the like connected to a network, the main storage unit 17 for holding the acquired data, and the control unit 18 for processing data retained by the application program. These hardware components have the same configurations as the corresponding hardware components of the information processing apparatus 100 shown in FIG. 2B.

The input unit 11 and the display unit 12 of the image processing apparatus 200 shown in FIG. 2A correspond to an input device I/F 21 and a display I/F 22 of the information processing apparatus 100 of FIG. 2B.

In this embodiment of the present invention, the minimum required components are the components shown in FIG. 2A excluding the printing unit 19 or the components shown in FIG. 2B. Accordingly, both the image processing apparatus 200 and the information processing apparatus 100 configured as shown in FIG. 2A and FIG. 2B, respectively, can provide the data conversion function capable of easily responding to a data structure change between data (hereinafter referred to as "system acquisition data") that are acquired by the system as the application utilization information and data (hereinafter referred to as "application usable data") that can be used by the application.

The minimum required components of the image processing apparatus 200 of this embodiment are about the same as the components of the information processing apparatus 100. Therefore, the information processing apparatus 100 is illustrated in the following description of the present embodiment.

Overview of the Present Embodiment

An overview of the present embodiment is described with reference to FIG. 3.

As shown in the schematic diagram of FIG. 3, operations of the data conversion function are divided into a data conversion step 31 for application utilization information and a data conversion step 32 for system acquisition data acquired by the system from a storage location (the term "storage location" as used herein refers to a local database, an SD card, an LDAP server, or the like). Data conversion between the application usable data and the system acquisition data is performed through the intermediary of universal data independent of the data structures of the application usable data and the system acquisition data, thereby lowering dependency between the data structures of the application usable data and the system acquisition data. Thus the data conversion function (data I/F function) can easily respond to a data structure change (upon installing or uninstalling an application, or upon connecting to or disconnecting from a storage location).

Next, main function units in the present embodiment are described with reference to FIG. 4.

Configuration Example of Main Function Units of the Present Embodiment

FIG. 4 is a diagram showing a configuration example of main function units of the information processing apparatus 100 according to the first embodiment of the present invention.

With reference to FIG. 4, in the information processing apparatus 100, the control unit 18 includes an application data manager 61, an application usable data converter 62, and a system acquisition data converter 63 as main functions to be executed for realizing employment of the present invention.

The application data manager 61 includes a data management I/F unit 611, and an application usable data converter management unit 612. The application data manager 61 serves mainly as an interface (I/F) between the system and the application, and is configured to add or remove a data conversion function capable of easily responding to expansion of the application usable data and the system acquisition data.

The application usable data converter 62 includes a data type determination unit 621 and an application usable data conversion unit 622. The application usable data converter 62 converts universal data generated by the system acquisition data converter 63 into the application usable data. The universal data contain data (an item name and an item value) independent of the data structures of the system acquisition data and the application usable data. The application usable data converter 62 also converts the application usable data into the universal data.

The system acquisition data converter 63 includes a storage data access unit 631 and a system acquisition data conversion unit 632. The system acquisition data converter 63 converts system acquisition data (i.e. storage data) acquired from the storage location into the universal data. The system acquisition data converter 63 also converts the universal data, which are converted from the application usable data by the application usable data converter 62, into the system acquisition data.

As described, the information processing apparatus 100 includes the application data manager 61, the application usable data converter 62, and the system acquisition data converter 63. The information processing apparatus 100 uses the application usable data converter 62 and the system acquisition data converter 63 to perform conversion between the application usable data and the system acquisition data, and uses the application data manager 61 to perform data manipulation (the term "data manipulation" as used herein refers to acquisition, search, registration, update, or deletion of data). Thus the information processing apparatus 100 provides the data conversion function (data I/F function) capable of easily responding to a data structure change between the application usable data and the system acquisition data.

Next, components of each main function unit are described with reference to FIGS. 5-13.

Implementation of the Main Function Units in the Present Embodiment

The components described below are designed and developed by object-oriented programming and implemented in the information processing apparatus 100. In the object-oriented programming, a set of related data and a procedure (method) associated with the data are managed as a unit called an "object", and combinations of objects constitute software. The object-oriented programming is described below in greater detail.

Object orientation is a paradigm for designing and developing software that places focus on a substance to be operated rather than a operational procedures. According to this paradigm, a set of related data and a procedure (method) associated with the data are managed as a unit called an "object", and combinations of objects constitute software. Since a set of data and the associated method are encapsulated into an object, the details of operations (specification and structure) inside the object are concealed. Encapsulated data cannot be manipulated from the outside unless a public procedure is used, and thus encapsulation prevents specification changes within the object from affecting other parts. This improves maintenance and development efficiency and makes partial reuse of a program easier. A programming technology based on this paradigm is OOP (object-oriented programming). Accordingly, in the object-oriented programming, data and a procedure (operational procedure (method)) for manipulating the data are combined as a unit called an object, and a program is described with combinations of objects. The object-oriented programming offers advantages such as making partial reuse of a program easier.

Components of the Main Function Units of the Present Embodiment

FIG. 5 is a block diagram showing components of the main function units of the information processing apparatus 100 according to the first embodiment of the present invention.

The components of the application data manager 61 are described below.

The data management I/F unit 611 is configured to determine a data access procedure and a data format for exchanging data between the system and the application so as to allow collective data manipulation in the plural storage locations storing the system acquisition data acquired by the system as the application utilization information (such as user information).

The data management I/F unit 611 has data manipulation functions of the system as methods. When a value (argument (parameter)) corresponding to a desired data manipulation operation is passed to the data management I/F unit 611, the operation is performed (i.e., a class defining the format of the object is called). Thus, the data management I/F unit 611 serves as software interface between the system and the application, allowing easy use of the system from the application (i.e., allowing easy use of the data conversion function of the system from the application).

For example, for registering application usable data 52 into a certain storage location, the application provides the data type and the application usable data 52 (object) to the data management I/F unit 611. Then, the data management I/F unit 611 calls a method for determining the type of data of the storage location. In this way it is determined whether the application usable data 52 can be registered in the storage location.

The application usable data converter management unit 612 is configured to add and remove the data conversion function (the data type determination unit 621, the application usable data conversion unit 622, and the system acquisition data conversion unit 632). The data conversion function is capable of easily responding to extension of the application usable data due to installation (addition) or uninstallation (deletion) of an application and extension of data handled by the system, such as extension of the system acquisition data due to connection to or disconnection from a storage location storing the system acquisition data. The data conversion function is described below in greater detail.

For example, when an application uses information in a storage location, such as user information in an SD card connected to the information processing apparatus 100 through the external storage device I/F 15 or bibliographic information in the local database, a data I/F having a function for converting the information in the storage location into application usable data needs to be provided between the application and the system that acquires the information from the storage location. The application usable data converter management unit 612 adds or removes this function (the application usable data conversion unit 622, the system acquisition data conversion unit 632, etc.) for converting the system acquisition data acquired by the system from the storage location into the application usable data (information customized for the application) in response to extension of data handled by the system.

The components of the application usable data converter 62 are described below.

The data type determination unit 621 is called by the data management I/F unit 611 so as to determine the data type of the storage location storing the system acquisition data.

The data type determination unit 621 determines the data type of each storage location (i.e. determines what type of information is stored in each storage location) and returns the determination result (i.e. information type of each storage location) to the data management I/F unit 611 which called the data type determination unit 621. The data type determination unit 621 receives a data manipulation request from the data management I/F unit 611 and specifies, based on the determination result of the data type, the application usable data conversion unit 622 corresponding to the storage location storing the information to be manipulated. The application usable data conversion unit 622 is a function for converting the system acquisition data into the application usable data, and is described below in greater detail.

The application usable data conversion unit 622 is called as a method for performing data conversion (interconversion) between the application usable data 52 and the universal data 53. The application usable data conversion unit 622 is called in response to a request for data manipulation issued to the data type determination unit 621 from the data management I/F unit 611 based on the determination result of the data type by the data type determination unit 621.

The application usable data conversion unit 622 converts the application usable data 52 into the universal data 53, which contains item names and item values and is independent of the data structures of the system acquisition data 54 and the application usable data 52. The application usable data conversion unit 622 also coverts the universal data 53 into the application usable data 52.

When converting the application usable data 52 into the universal data 53, the application usable data conversion unit 622 acquires a string of an attribute name (e.g. an attribute name "name") and an attribute value corresponding to the attribute name (e.g. an attribute value "tanaka" corresponding to the attribute name "name"), and stores the attribute value as an item value of the universal data 53 using the string of the acquired attribute name as a key. Conversely, when converting the universal data 53 into the application usable data 52, the application usable data conversion unit 622 stores an item value of the universal data 53 as an attribute value of the application usable data 52 using a string of the attribute name of the attribute necessary for the application usable data 52 as a key. In this way, data conversion between the application usable data 52 and the universal data 53 is performed.

The application usable data conversion unit 622 is a function for converting the universal data 53 into the application usable data 52 and corresponds to a group of application usable data constituting a set of application utilization information (e.g. a set of user information 51). The application usable data conversion unit 622 is provided one for each application utilization information set, and is added or removed by the application usable data converter management unit 612. If plural application utilization information sets are present in the system, plural of the application usable data conversion units 622 are provided. The data type determination unit 621 selects the application usable data conversion unit 622 corresponding to the application utilization information set out of the plural application usable data conversion units 622 present in the system. With this configuration, the same application usable data conversion function of the system can be used both in the case where different applications use different utilization information sets and in the case where one application uses different utilization information sets. Accordingly, the application does not need to be aware of different data conversion procedures for different utilization information sets.

The components of the system acquisition data converter 63 are described below.

The storage data access unit 631 is configured to manipulate the system acquisition data 54 in the storage location according to the data manipulation request from the application.

For manipulating the data in the storage location, the storage data access unit 631 calls a method for performing the requested data manipulation operation. The storage data access unit 631 also calls a method for performing data conversion between the system acquisition data 54 and the universal data 53 in response to the data manipulation request from the application, as necessary.

The system acquisition data conversion unit 632 is called by the storage data access unit 631 and converts the universal data 53 into system acquisition data 54 based on the data type specified by the application in accordance with the corresponding data structure (hereinafter referred to also as a "storage data format"). The system acquisition data conversion unit 632 also converts the system acquisition data 54 into the universal data 53.

When converting the universal data 53 into the system acquisition data 54, the system acquisition data conversion unit 632 stores an item value of the universal data 53 as an attribute value of the system acquisition data 54 using a string of the attribute name of the attribute necessary for the system acquisition data 54 as a key. Conversely, when converting the system acquisition data 54 into the universal data 53, the system acquisition data conversion unit 632 acquires a string of an attribute name (e.g. an attribute name "name") and an attribute value corresponding to the attribute name (e.g. an attribute value "tanaka" corresponding to the attribute name "name"), and stores the attribute value as an item value of the universal data 53 using the string of the acquired attribute name as a key. In this way, data conversion between the system acquisition data 54 and the universal data 53 is performed.

The following describes data (application usable data, system acquisition data, etc., shown in FIG. 5) handled by each component.

Data Structures Handled by the Main Function Units of this Embodiment

Figure 6:
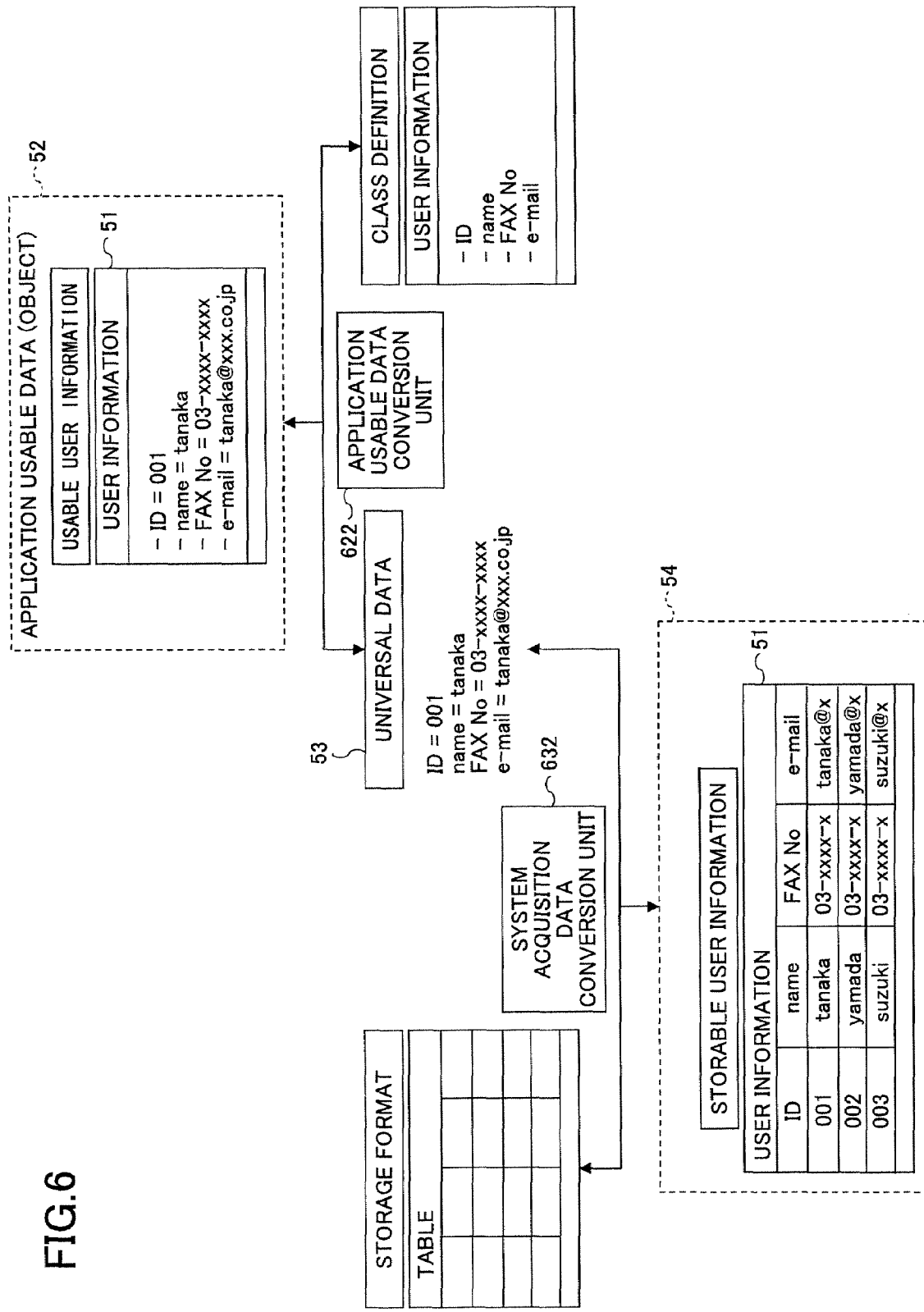
FIG. 6 is a diagram showing a data configuration used in the information processing apparatus according to the first embodiment of the present invention.

FIG. 6 is a diagram showing a data configuration used in the information processing apparatus 100 according to the first embodiment of the present invention.

As shown in FIG. 6, data handled by the information processing apparatus 100 of this embodiment include the application usable data 52, the system acquisition data 54, and the universal data 53. The application usable data 52 include the application utilization information set (e.g. the user information set 51). The system acquisition data 54 are acquired by the system from the storage location as the application utilization information set. The universal data 53 include item names and item values and are independent of the data structures of the application usable data 52 and the system acquisition data 54.

In the case where the application utilization information set is the user information set 51, the universal data 53 include, for example, item names (string data indicating data items) such as "user ID", "name", "FAX No.", and "e-mail address" and corresponding item values such as "001", "tanaka", "03-xxxx-xxxx" and "tanaka@xxx.co.jp" in a data structure independent of the data structures of the application usable data 52 and the system acquisition data 54. The number of pairs of item names and item values are the same as the number of the items.

With regard to the application usable data 52, the application usable data conversion unit 622 stores the item names and the item values of the universal data 53 as the attribute names and the attribute values, respectively, according to a class definition (a format of an object containing data and a method) for the user information set 51. Thus the application usable data 52 are generated as application utilization information set (i.e. the user information set 51). In other words, the application usable data 52 are generated as data that can be used by the application.

The correspondence relationship between the item name and the item value of the universal data 53 and the attribute name and the attribute value of the user information set 51 is described below.

For example, in the case where a file is used as a format for data management, data can be managed in terms of "file", "record", and "item". In the case of a database such as a RDB (relational database), data can be managed in terms of "table", "row", and "column". In this embodiment, data of the user information set 51 are managed in an OODB (object oriented database). In the OODB, the data are managed in terms of "object", "instance", and "attribute". Accordingly, with regard to the RDB and the OODB, the "column" of the RDB corresponds to the "attribute" of the OODB. With regard to the file and the OODB, the "item" corresponds to the "attribute". Therefore, the item name and the item value of the universal data 53 correspond to the attribute name and the attribute value of the user information set 51, respectively.

With regard to the system acquisition data 54, the system acquisition data conversion unit 632 stores the item names and the item values of the universal data 53 as the attribute names and the attribute values of the system acquisition data 54, respectively, for the attributes of the system acquisition data 54 required according to their storage format. Thus the system acquisition data 54 are generated as the user information set 51 that is acquired by the system as the application utilization information (i.e., the system acquisition data 54 are generated as the data that can be stored in the storage location).

In this way, the information processing apparatus 100 of this embodiment has a data area for the universal data 53, which contain item names and item values and are independent of the data structures of the application usable data 52 and the system acquisition data 54, in the RAM. Thus the information processing apparatus 100 performs data conversion between the application usable data 52 and the system acquisition data 54 through the intermediary of the universal data 53 by using the application usable data conversion unit 622 and the system acquisition data conversion unit 632.

Figure 7:
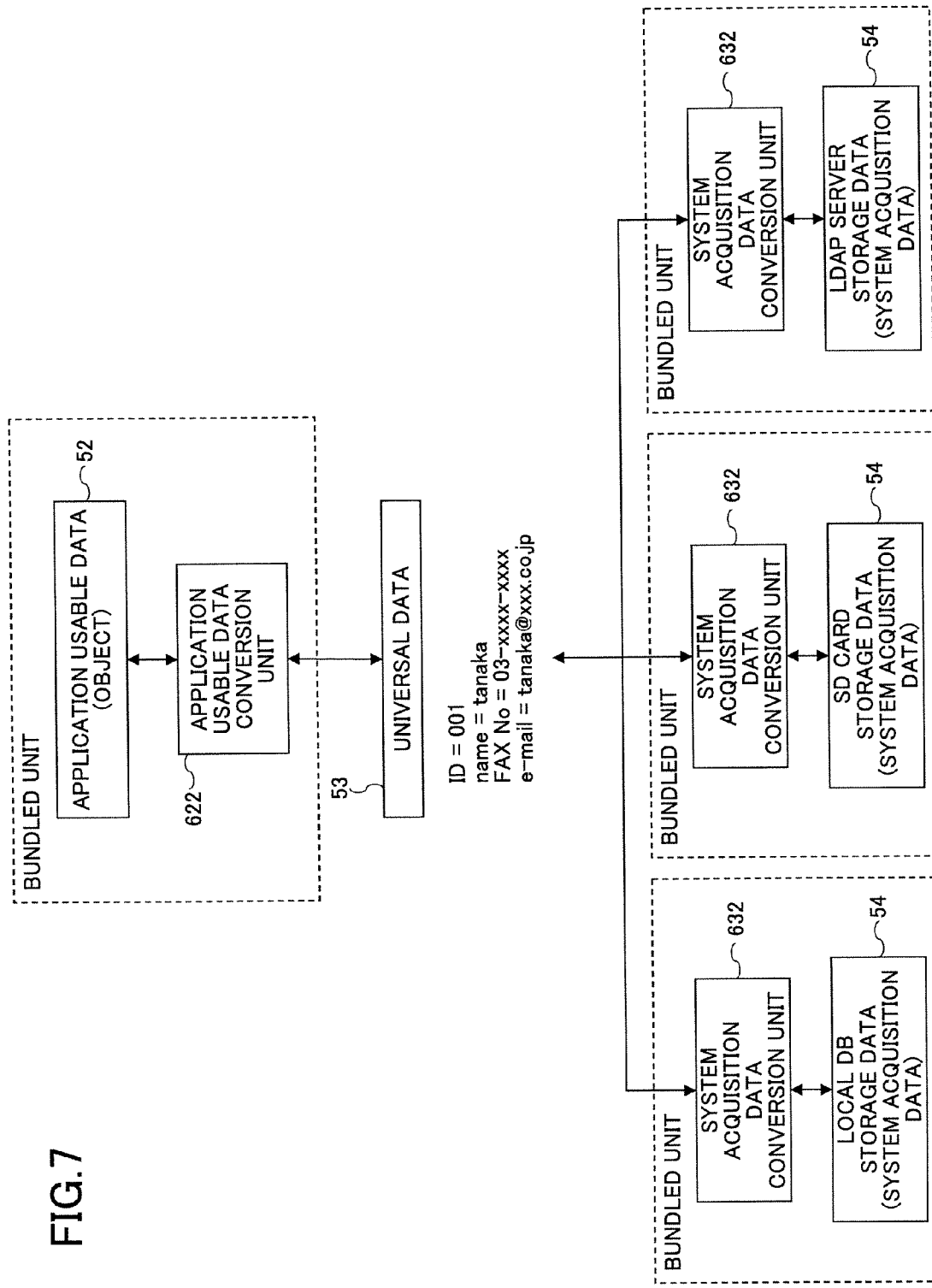
FIG. 7 is a diagram showing a data conversion function unit employed in the information processing apparatus according to the first embodiment of the present invention.

Managing the Data Conversion Functions of the Main Function Units of the Present Embodiment FIG. 7 is a diagram showing a data conversion function unit employed in the information processing apparatus 100 according to the first embodiment of the present invention.

As shown in FIG. 7, the application usable data 52 and the application usable data conversion unit 622 are managed in units of application utilization information sets. The system acquisition data 54 and the system acquisition data conversion unit 632 are managed in units of bundles (functionally-independent units, removable units) of each storage location.

With this configuration, even if the data structure is changed upon installing an application, connecting a storage location, or the like, it is possible to react to the change by extending the corresponding data conversion unit in units of bundles. Further, with this configuration, even if the data structure is changed upon uninstallation of an application, disconnecting a storage location, or the like, it is possible to easily react to the change by removing the corresponding data conversion unit in units of bundles.

That is, it is possible to easily respond to status changes of applications (extended functions) or the storage locations of the information processing apparatus 100. In other words, it is possible to easily manage and operate functional modules.

Figure 8:
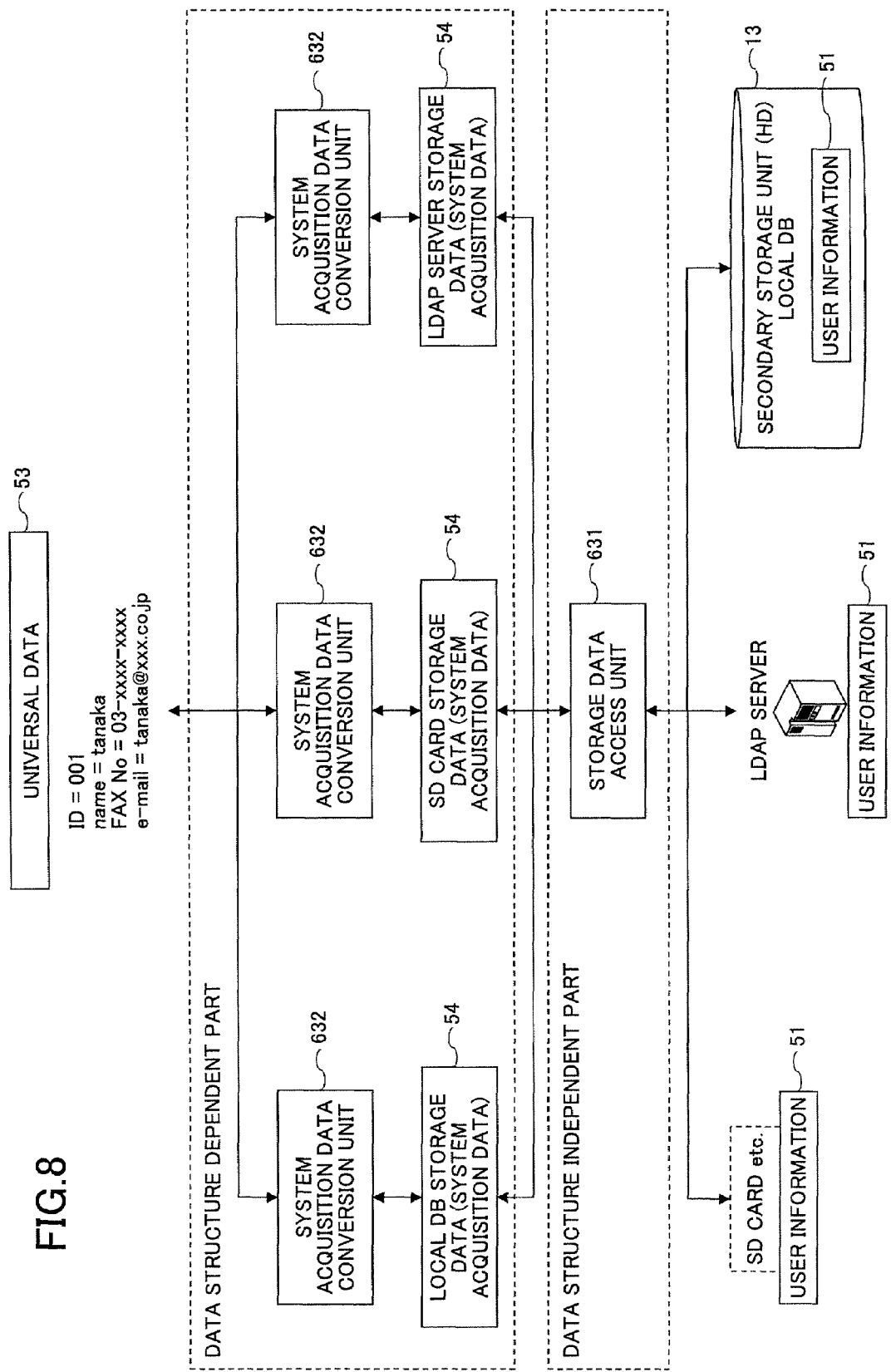
FIG. 8 is a block diagram showing a system acquisition data converter of the information processing apparatus according to the first embodiment of the present invention.

The System Acquisition Data Converter 63 of the Present Embodiment that Absorbs Data Structure Characteristics of Each Storage Location FIG. 8 is a diagram showing the system acquisition data converter 63 of the information processing apparatus 100 according to the first embodiment of the present invention.

As shown in FIG. 8, the procedure for converting the universal data 53 into the system acquisition data 54 can be divided into a part dependent on the data structures of the storage locations and a part independent of the data structures of the storage locations (herein after referred to as a "data structure dependent part" and "a data structure independent part", respectively).

The data structure dependent part corresponds to operations by the system acquisition data conversion unit 632 for converting the universal data 53 into the system acquisition data 54 in accordance with the storage format of the corresponding storage location. The data structure independent part corresponds to access operations by the storage data access unit 631 for manipulating data such as loading system acquisition data 54 resulting from conversion by the system acquisition data conversion unit 632.

Dividing the operational procedure taken by the system acquisition data converter 63 into the data structure dependent part and the data structure independent part makes it possible to localize a portion that needs to react to a data structure change of the storage location, thereby facilitating operations. That is, connection or disconnection of the storage location can be performed with the minimum changes (changes within the data structure dependent part).

Figure 9:
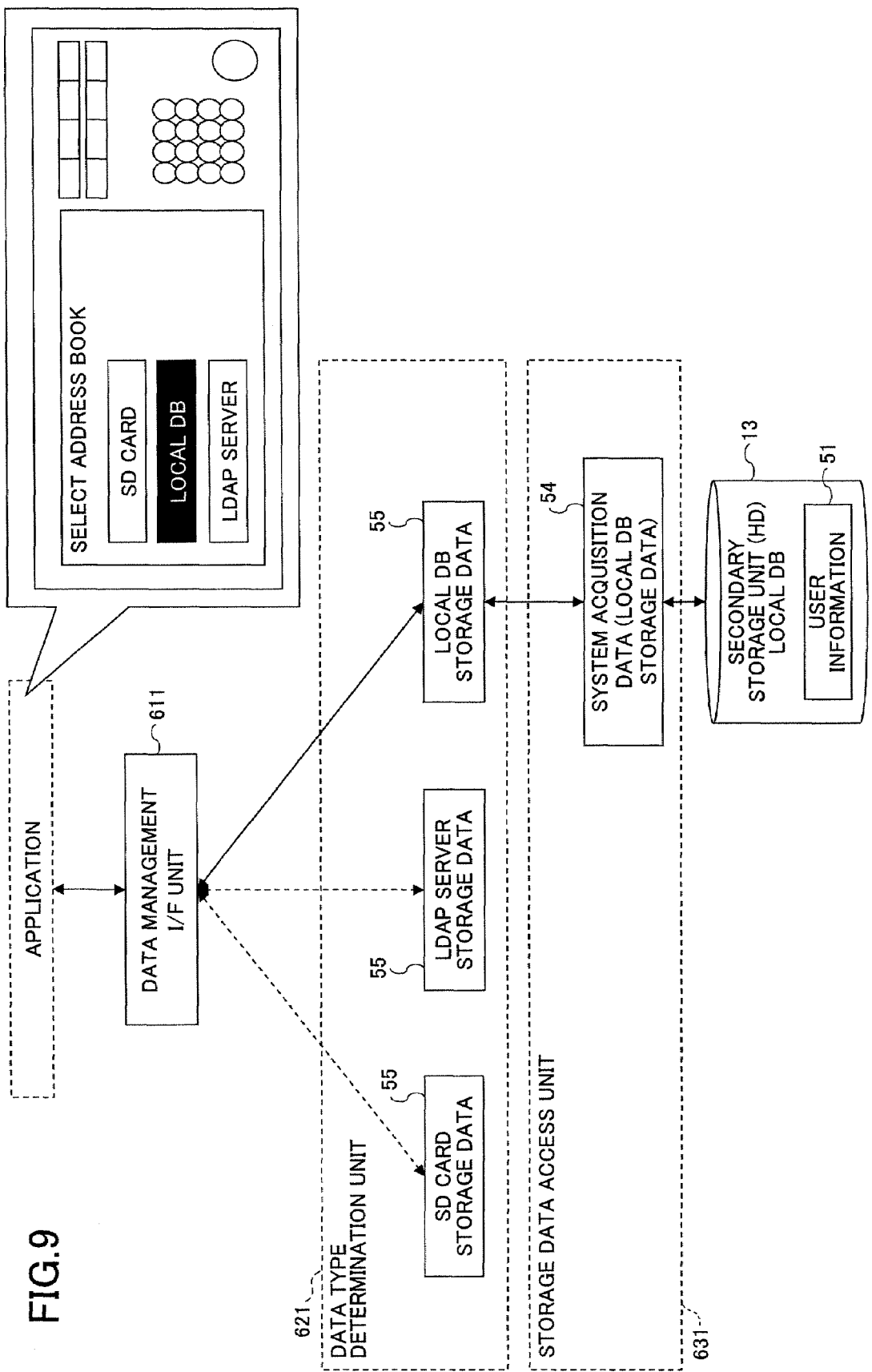
FIG. 9 is a diagram used to illustrate an example of an operation (for specifying a storage location and manipulating data) in the information processing apparatus according to the first embodiment of the present invention.

Data Manipulation Operations by the Main Function Units in the Present Embodiment FIG. 9 is a diagram used to illustrate an example of an operation (for specifying a storage location and manipulating data) in the information processing apparatus 100 according to the first embodiment of the present invention.

In the example of an operation shown in FIG. 9 is for specifying the storage location "local DB" and manipulating data therein. The application determines (specifies) the storage location storing the system acquisition data 54 that is to be manipulated by the application. In FIG. 9, the storage location "local DB" that stores an address book including the user information set 51 is shown selected (highlighted).

If the storage location "local DB" is selected as in FIG. 9, the data management I/F unit 611 acquires as parameters the data type "user information set 51" and the storage location "local DB" specified for storing the user information set 51, and calls the data type determination unit 621 for identifying the data type of the local DB. The data type determination unit 621 determines whether the user information set 51 is present as a data type for the local DB based on storage information 55 indicating information stored in the local DB. Based on the determination result, a data acquisition request is passed to the storage data access unit 631. In response to the request, the storage data access unit 631 acquires the user information set 51 from the storage location "local DB" according to a data acquisition method. The acquired user information set 51 is converted into the universal data 53 by the system acquisition data conversion unit 632. Then the universal data 53 are converted into the application usable data 52 by the application usable data conversion unit 622. Then the application usable data 52 are used as the user information set 51 by the application that requested data acquisition from the storage location "local DB".

In this way, the application specifies for the data management I/F unit 611 the information to be manipulated (the data type) and the storage location storing the information, and thus can manipulate the system acquisition data 54 in the specified storage location.

Even if plural storage locations such as the local DB, the SD card, and the LDAP server are present as in FIG. 9, data manipulation can be performed by a common I/F (the data management I/F unit 611). That is, connection to or disconnection from the storage location does not affect data manipulation by the application. This allows easy use of data conversion function of the system from the application.

Figure 10:
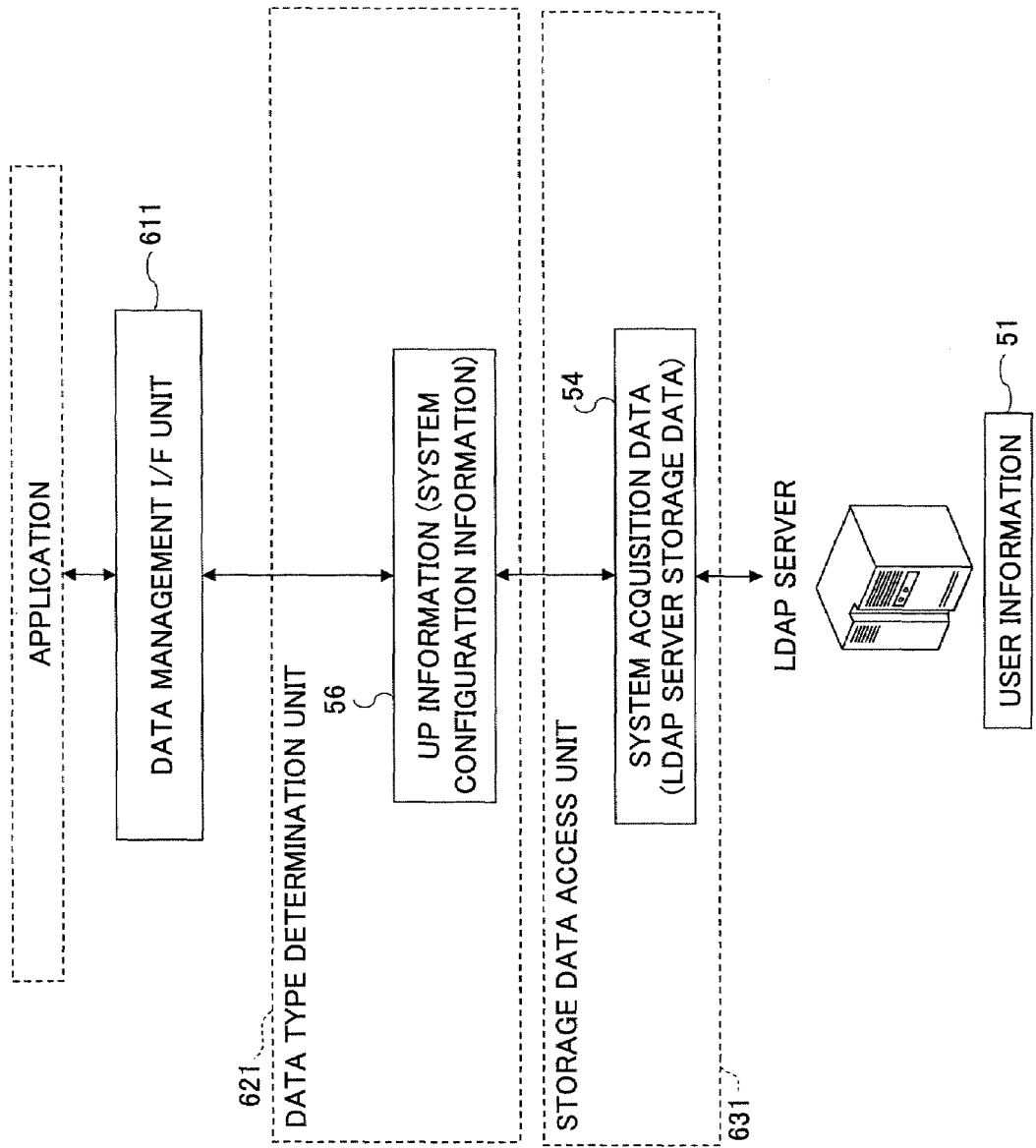
FIG. 10 is a diagram used to illustrate an example of an operation (for determining a storage location based on UP information) in the information processing apparatus according to the first embodiment of the present invention.

FIG. 10 is a diagram used to illustrate an example of an operation (for determining the storage location based on UP information) in the information processing apparatus 100 according to the first embodiment of the present invention.

The example of an operation shown in FIG. 10 is for manipulating data in one of the storage locations (the LDAP server in this example).

As one method for specifying the storage location, the application may automatically acquire information about the active system and perform data manipulation based on the acquired storage location information. The difference from the example of FIG. 9 is that the storage location information contained in system configuration information (UP information) is used when the data type determination unit 621 determines the data type of the storage location. The application calls the data management I/F unit 611 using only information about data to be manipulated (data type) as a parameter. Then the data management I/F unit 611 calls the data type determination unit 621. The data type determination unit 621 detects the storage device storing information to be acquired, and sends the detection result back to the data management I/F unit 611. With this configuration, the application can perform data manipulation regardless of the data structure of the storage location (e.g. regardless whether the user information set 51 is present).

Data Flow During Data Manipulation in the Present Embodiment

Figure 11:
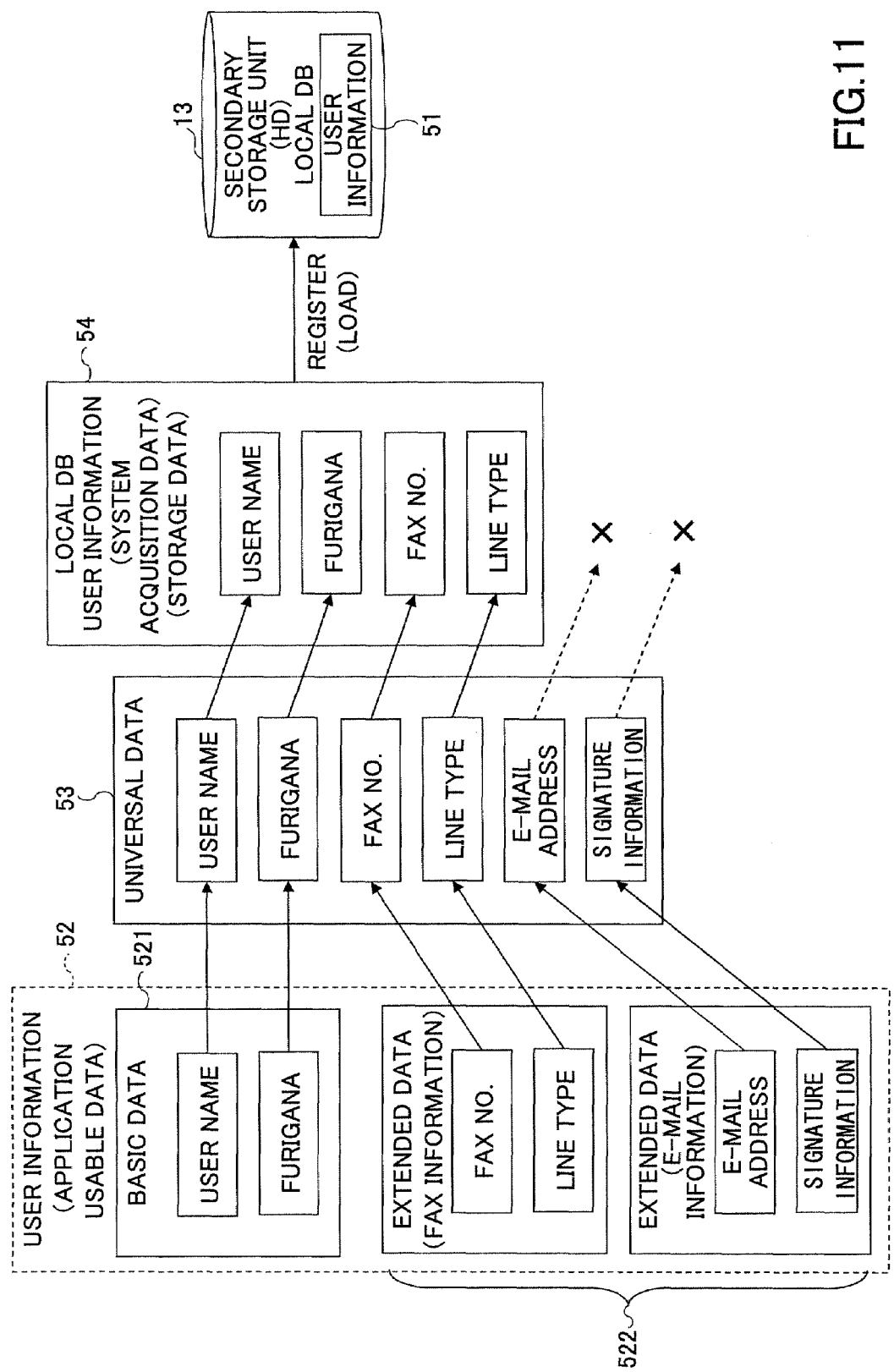
FIG. 11 is a diagram used to illustrate a flow of data (application usable data being loaded into a storage location "local DB" for registration or update) according to the first embodiment of the present invention.

FIG. 11 is a diagram used to illustrate a flow of data (the application usable data 52 being loaded into the storage location "local DB" for registration or update) according to the first embodiment of the present invention.

The example shown in FIG. 11 shows a flow of the application usable data 52 being loaded into storage location "local DB" by the data type determination unit 621, the application usable data conversion unit 622, the storage data access unit 631, and the system acquisition data conversion unit 632 according to a data registration request or an update request.

In the example shown in FIG. 11, the application usable data 52 contain basic data 521 and extended data 522. The basic data 521 contains "user name" (which may be written in kanji or other characters) and "furigana" (indicating the pronunciation of kanji). The extended data 522 contain FAX information including "FAX number", "line type" and "e-mail address" and e-mail information including "e-mail address" and "signature information".

The basic data 521 are used commonly by plural applications while the extended data 522 are used only by a specific application.

For example, in the case where the user information set 51 is used by plural applications, the user information set 51 is divided into the basic data 521 containing the items "user name" and "furigana" that are commonly used by the plural applications and the extended data 522 containing items "FAX number", "line type", "e-mail address" and "signature information" that are used by the specific application.

Accordingly, the extended data 522 used by the specific application based on the basic data 521 can be added to the application usable data 52 at the time of installation of the application or deleted from the application usable data 52 at the time of uninstallation. This configuration facilitates management and use of extended data 522 having an application specific data structure.

When the application specifies the local DB as the storage location, the data type determination unit 621 identifies the type of the local DB. Then, according to a data registration/update request, the application usable data conversion unit 622 converts the application usable data 52 into the universal data 53. Thereafter, the system acquisition data conversion unit 632 converts the universal data 53 into the system acquisition data 54 in accordance with the storage format of the local DB. In this step, if the data structure of the local DB contains only "user name", "furigana", "FAX number", and "line type" as attribute names, the item values of "e-mail address" and "signature information" of the universal data 53 are ignored. That is, item values of the item names corresponding to the attribute names present in the data structure of the local DB are extracted from the item values of the items of the user information set 51 in the universal data 53, thereby generating the system acquisition data 54 corresponding to the data structure of the local DB. As the last step, the storage data access unit 631 loads the generated system acquisition data 54 into the local DB, thereby performing data registration/update.

Figure 12:
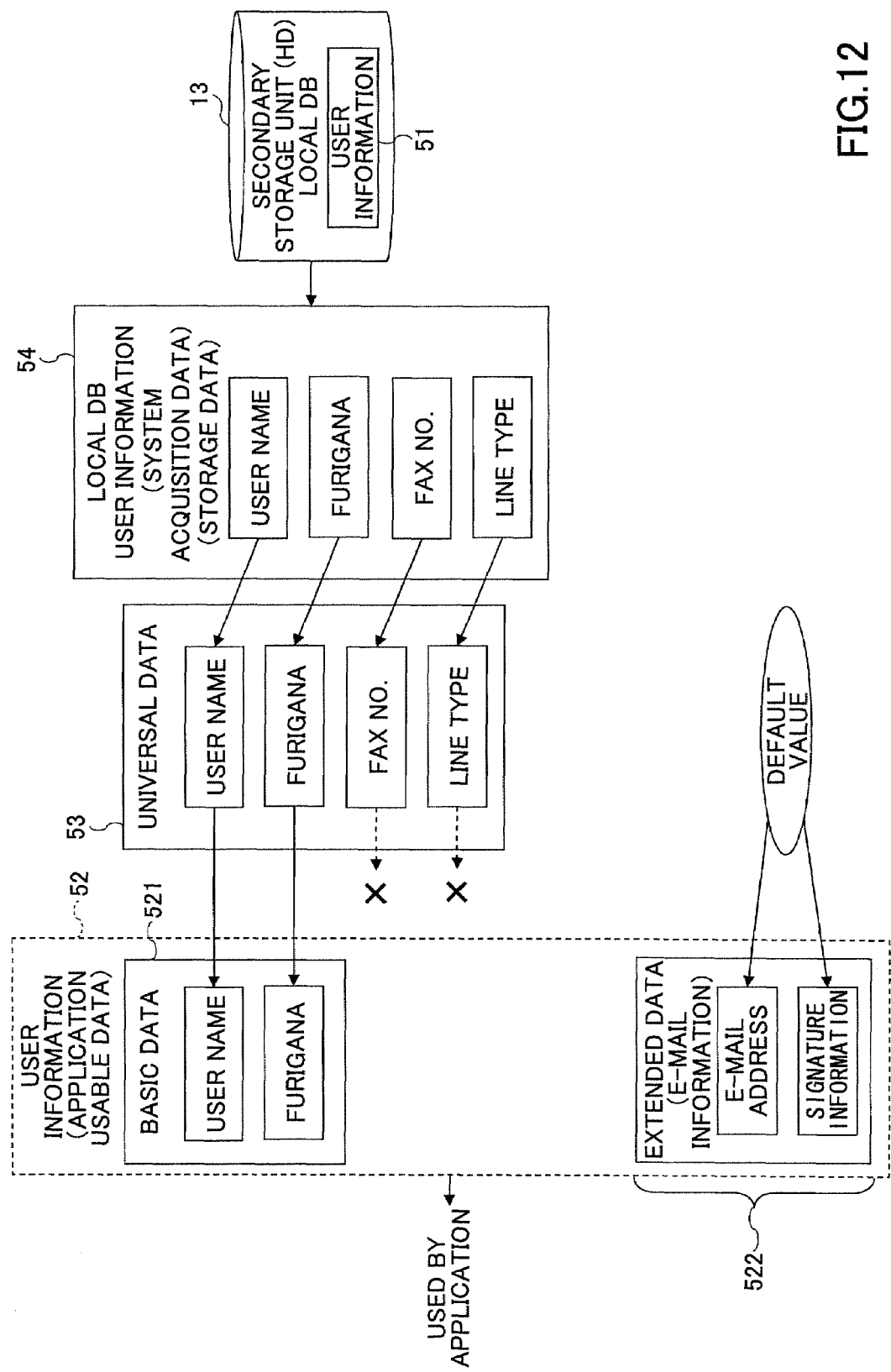
FIG. 12 is a diagram used to illustrate a flow of data (system acquisition data in a storage location "local DB" being converted into application usable data) according to the first embodiment of the present invention.

FIG. 12 is a diagram used to illustrate a flow of data (the system acquisition data 54 in the storage location "local DB" being converted into the application usable data 52) according to the first embodiment of the present invention.

Contrary to the example of FIG. 11, the example of FIG. 12 shows a flow of the system acquisition data 54 in the local DB being converted into the application usable data 52 so as to be used as the user information set 51 by the application.

First, the storage data access unit 631 acquires the system acquisition data 54 from the local DB, and then the system acquisition data conversion unit 632 converts the system acquisition data 54 into the universal data 53. If the information processing apparatus 100 does not have a facsimile function, the application usable data conversion unit 622 discards the item values of "FAX number" and "line type" of the FAX information contained in the universal data 53. The "e-mail address" and "signature information" of the e-mail information necessary for the data structure of the user information set 51 (application usable data 52) are not included in the attribute names in the system acquisition data 54 of the local DB, and therefore the item values of the "e-mail address" and "signature information" of the e-mail information are not loaded into the universal data 53 to be converted into the application usable data 52. As the item values corresponding to the item names "e-mail address" and "signature information" of the extended data 522 of the application usable data 52, default values for the "e-mail address" and "signature information" of the e-mail information that are preset in the system are registered. In this way, the item values corresponding to the item names necessary for the data structure of the user information set 51 (application usable data 52) are extracted from the universal data 53, while the system default values are applied to the item values that cannot be extracted from the universal data 53. Thus the application usable data 52 are generated.

Figure 13:
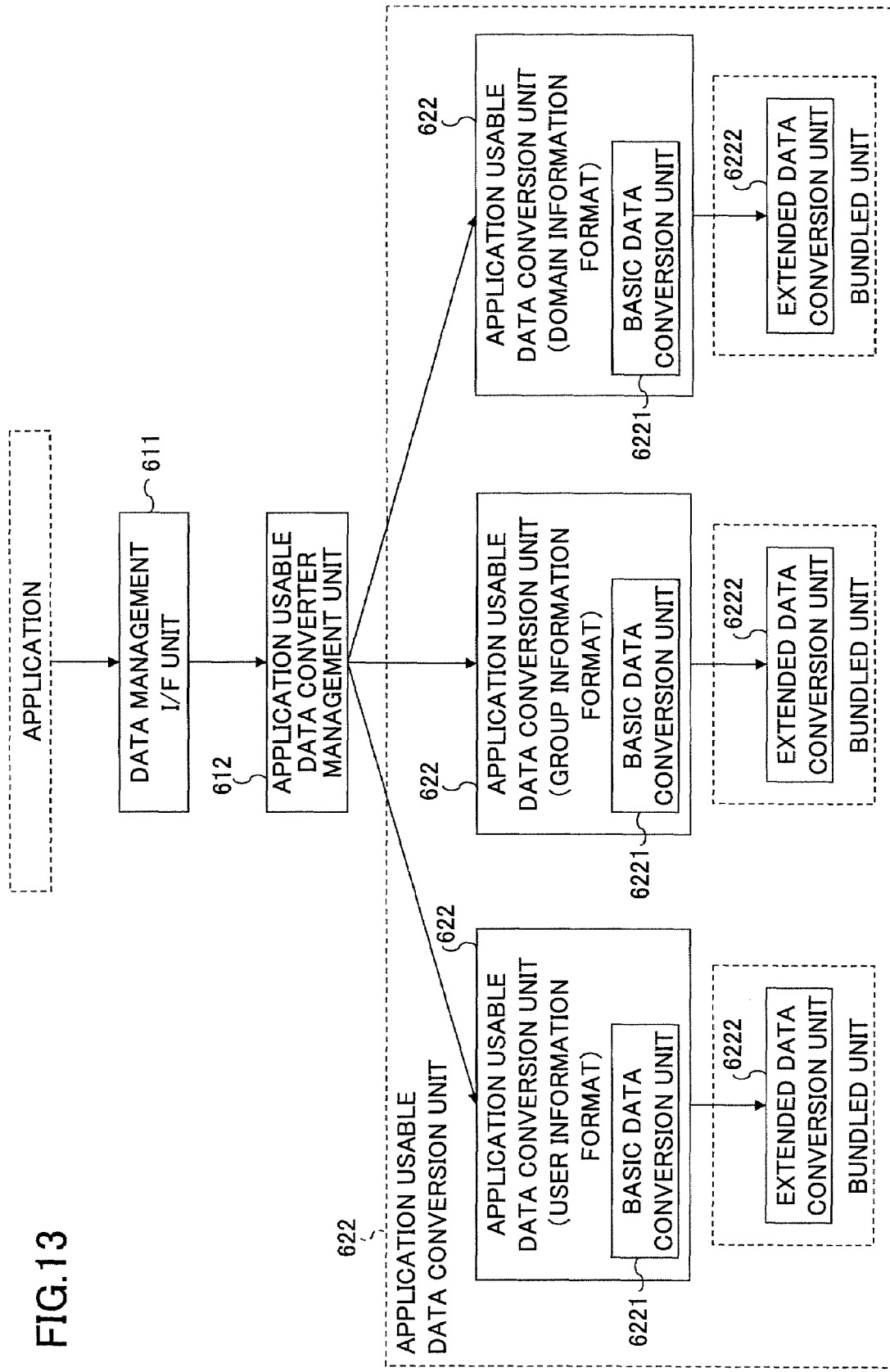
FIG. 13 is a diagram showing management functions of an application usable data conversion unit of the information processing apparatus (in the case where plural application utilization information sets are present) according to the first embodiment of the present invention.

The Application Usable Data Converter Management Unit 612 for Managing Components of the Application Usable Data Converter 62 in this Embodiment FIG. 13 is a diagram showing management functions of the application usable data conversion unit 622 of the information processing apparatus 100 (in the case where plural application utilization information sets are present) according to the first embodiment of the present invention.

As described with reference to FIG. 7, the application usable data conversion unit 622 is provided one for each application utilization information set. If plural application utilization information sets (e.g. the user information set 51, a group information set, a domain information set, etc.) are present, plural application usable data conversion units 622 are provided corresponding to the respective utilization information sets. Accordingly, with reference to FIG. 13, when an application is installed or uninstalled, the application usable data converter management unit 612 adds or removes an appropriate application usable data conversion unit 622 corresponding to the application utilization information set.

As mentioned with reference to FIGS. 11 and 12, the application usable data 52 include the basic data 521 and the extended data 522. Accordingly, the application usable data conversion unit 622 includes a basic data conversion unit 6221 for data conversion (interconversion) between the basic data 521 and the universal data 53 and an extended data conversion unit 6222 for data conversion (interconversion) between the extended data 522 and the universal data 53. When an application is installed or uninstalled, the extended data conversion unit 6222 is added or removed by the application usable data converter management unit 612 in response to extension of data handled by the application.

In this way, the application usable data converter management unit 612 manages (adds or removes) the extended data conversion unit 6222 corresponding to the application utilization information set in response to extension of data handled by the application, thereby allowing easy use of the data conversion function of the system from the application. In the case where the data structure of the application utilization information set is changed due to installation or uninstallation of the application, the extended data conversion unit 6222 can be removed in units of bundles. It is therefore possible to localize a portion that needs to react to the data structure change, thereby facilitating operations for reacting to the change.

Procedures taken by the components of the main function units are described below in greater detail with reference to flowcharts of FIGS. 14 though 19.

Figure 14:
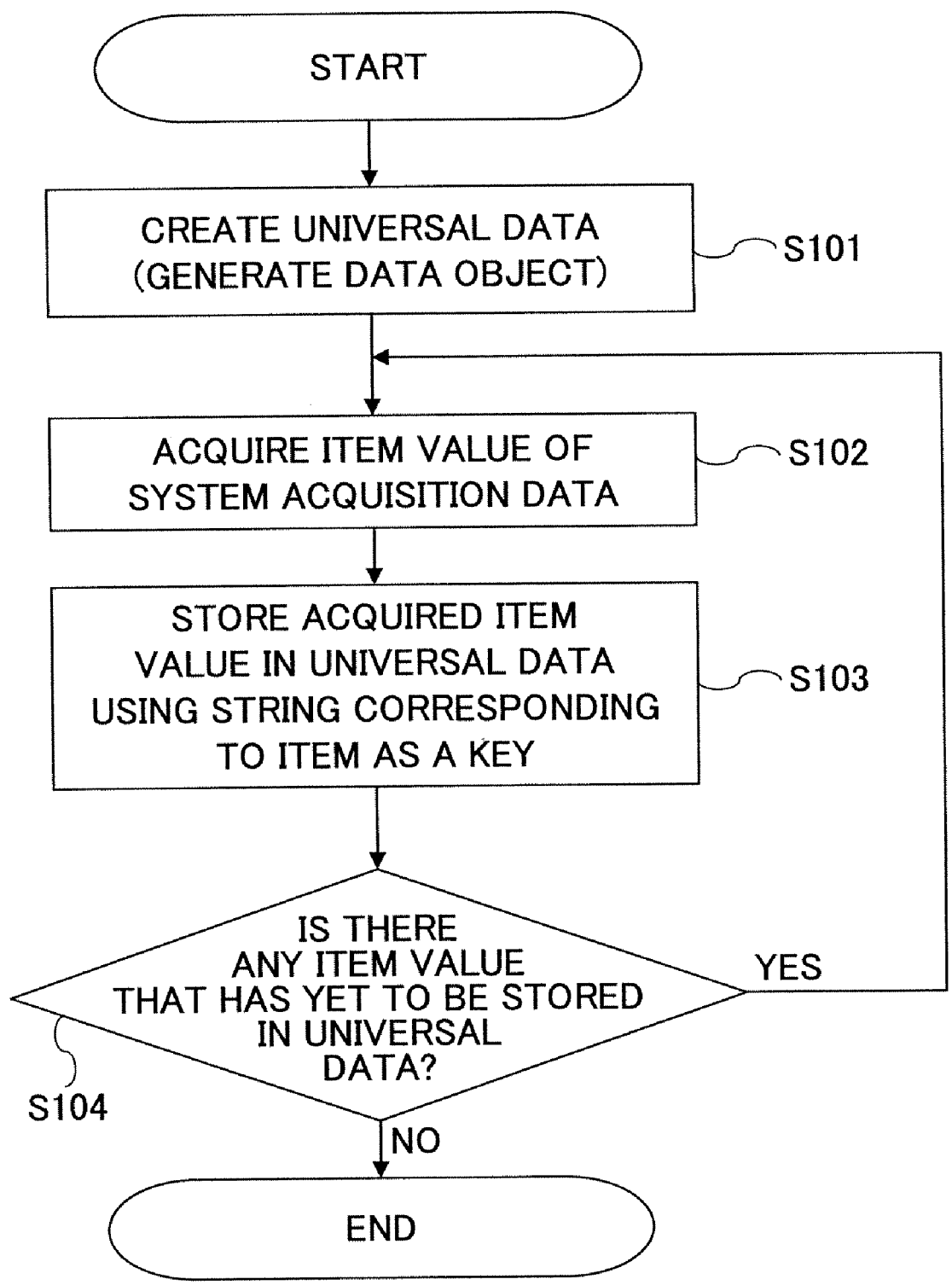
FIG. 14 is a flowchart showing a procedure (for converting system acquisition data into universal data) taken by a system acquisition data conversion unit of the information processing apparatus according to the first embodiment of the present invention.

Procedures Taken by the Components of the Main Function Units in the Present Embodiment FIG. 14 is a flowchart showing a procedure (for converting the system acquisition data 54 into the universal data 53) taken by the system acquisition data conversion unit 632 of the information processing apparatus 100 according to the first embodiment of the present invention.

The system acquisition data conversion unit 632 generates (secures) a data space for the universal data 53 in the RAM (i.e., the system acquisition data conversion unit 632 generates a data object in the RAM and initializes item names and item values) (S101).

Then the system acquisition data conversion unit 632 acquires an item name and an item value from the system acquisition data 54 which have been acquired by the storage data access unit 631 (S102), and stores the acquired item value in the universal data 53 using a string corresponding to the item as a key (S103).

Then the system acquisition data conversion unit 632 determines whether there is an item value that has yet to be stored in the universal data 53 (S104).

If there is an item value that has yet to be stored in the universal data 53 (YES in S104), the steps S102 and S103 are repeated. If all the item values are stored in the universal data 53 and thus there is no item value that has yet to be stored in the universal data 53 (NO in S104), the procedure ends.

Figure 15:
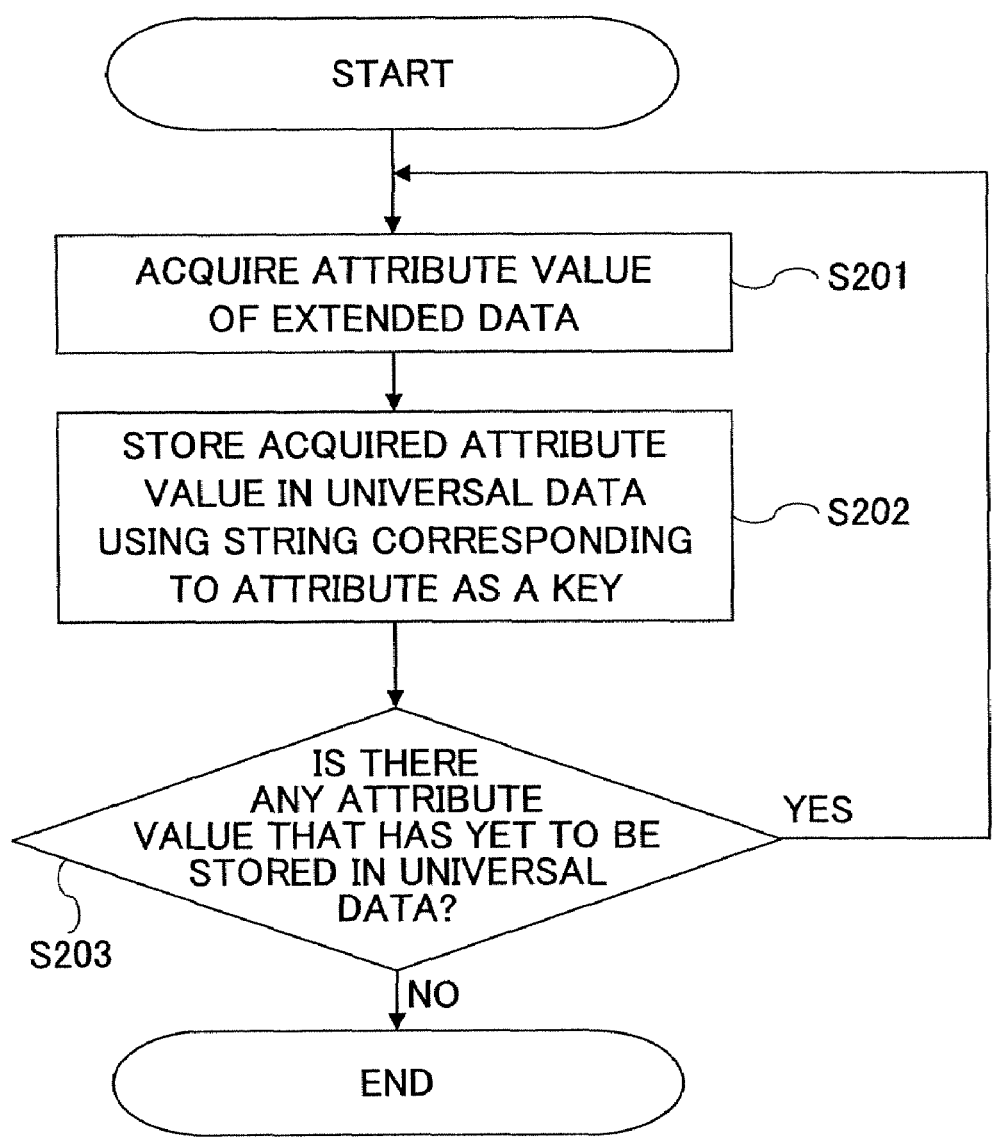
FIG. 15 is a flowchart showing a procedure (for converting extended data into universal data) taken by an extended data conversion unit of an application usable data conversion unit of the information processing apparatus 100 according to the first embodiment of the present invention.

FIG. 15 is a flowchart showing a procedure (for converting the extended data 522 into the universal data 53) taken by the extended data conversion unit 6222 of the application usable data conversion unit 622 of the information processing apparatus 100 according to the first embodiment of the present invention.

The application usable data conversion unit 622 acquires an attribute value of the extended data 522 (S201).

Then the application usable data conversion unit 622 stores the acquired attribute value in the universal data 53 using a string corresponding to the attribute as a key (S202), and determines whether there is an attribute value that has yet to be stored in the universal data 53 (S203).

If there is an attribute value that has yet to be stored in the universal data 53 (YES in S203), the steps S201 and S202 are repeated. If all the attribute values are stored in the universal data 53 and thus there is no attribute value that has yet to be stored in the universal data 53 (NO in S203), the procedure ends.

Figure 16:
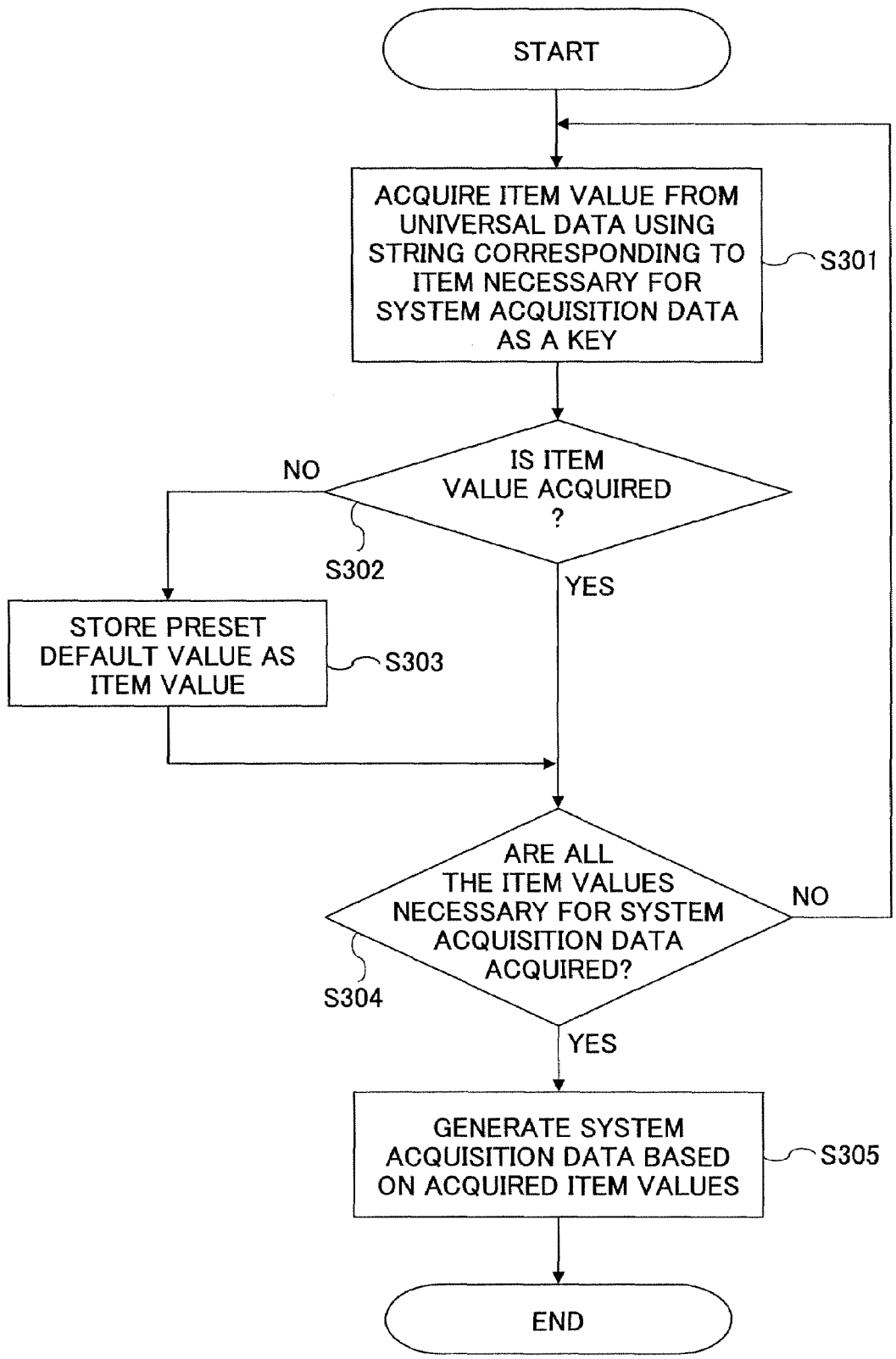
FIG. 16 is a flowchart showing a procedure (for converting universal data into system acquisition data) taken by a system acquisition data conversion unit of the information processing apparatus according to the first embodiment of the present invention.

FIG. 16 is a flowchart showing a procedure (for converting the universal data 53 into the system acquisition data 54) taken by the system acquisition data conversion unit 632 of the information processing apparatus 100 according to the first embodiment of the present invention.

The system acquisition data conversion unit 632 acquires an item value from the universal data 53 using a string corresponding to the item necessary for the system acquisition data 54 as a key (S301), and determines whether the acquisition of the item value is successful (S302).

If the acquisition of the item value fails (NO in S302), the system acquisition data conversion unit 632 determines that the item value does not exist and therefore stores a preset default value as the item value (S303). If the acquisition of the item value is successful (YES in S302), the system acquisition data conversion unit 632 determines whether all the item values necessary for the system acquisition data 54 are acquired (S304).

If not all the item values necessary for the system acquisition data 54 are acquired yet (NO in S304), the steps S301-S303 are repeated. If all the item values necessary for the system acquisition data 54 are acquired (YES in S304), the system acquisition data 54 are generated based on the acquired item values (S305).

Figure 17:
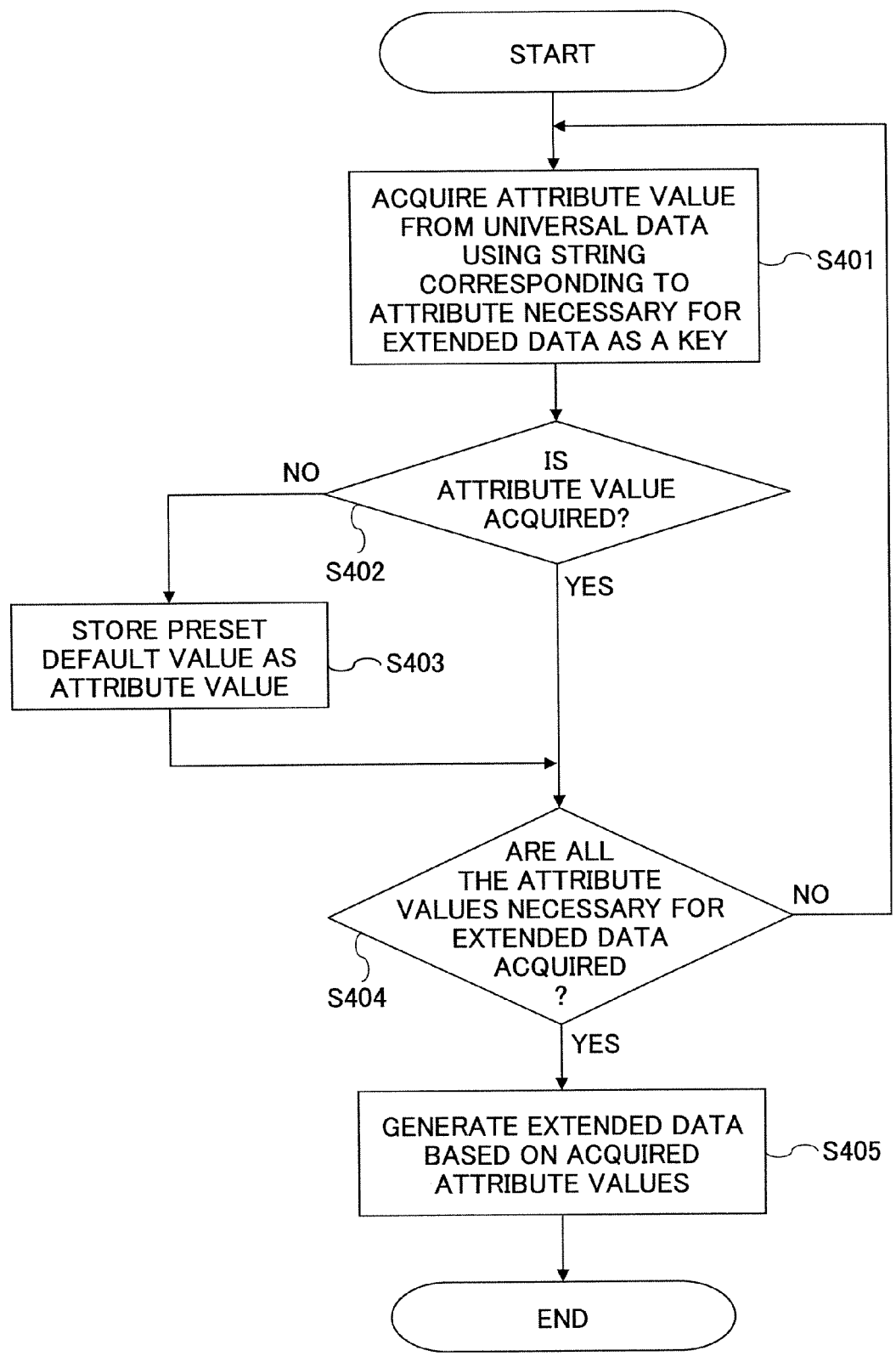
FIG. 17 is a flowchart showing a procedure (for converting universal data into extended data) taken by an extended data conversion unit of an application usable data conversion unit of the information processing apparatus according to the first embodiment of the present invention.

FIG. 17 is a flowchart showing a procedure (for converting the universal data 53 into the extended data 522) taken by the extended data conversion unit 6222 of the application usable data conversion unit 622 of the information processing apparatus 100 according to the first embodiment of the present invention.

The application usable data conversion unit 622 acquires an attribute value from the universal data 53 using a string corresponding to the attribute necessary for the extended data 522 as a key (S401), and determines whether the acquisition of the attribute value is successful (S402).

If the acquisition of the attribute value fails (NO in S402), the application usable data conversion unit 622 determines that the attribute value does not exist and therefore stores a preset default value as the attribute value (S403). If the acquisition of the attribute value is successful (YES in S402), the application usable data conversion unit 622 determines whether all the attribute values necessary for the extended data 522 are acquired (S404).

If not all the attribute values necessary for the extended data 522 are acquired yet (NO in S404), the steps S401-S403 are repeated. If all the attribute values necessary for the extended data 522 are acquired (YES in S404), the extended data 522 are generated based on the acquired attribute values (S405).

Figure 18:
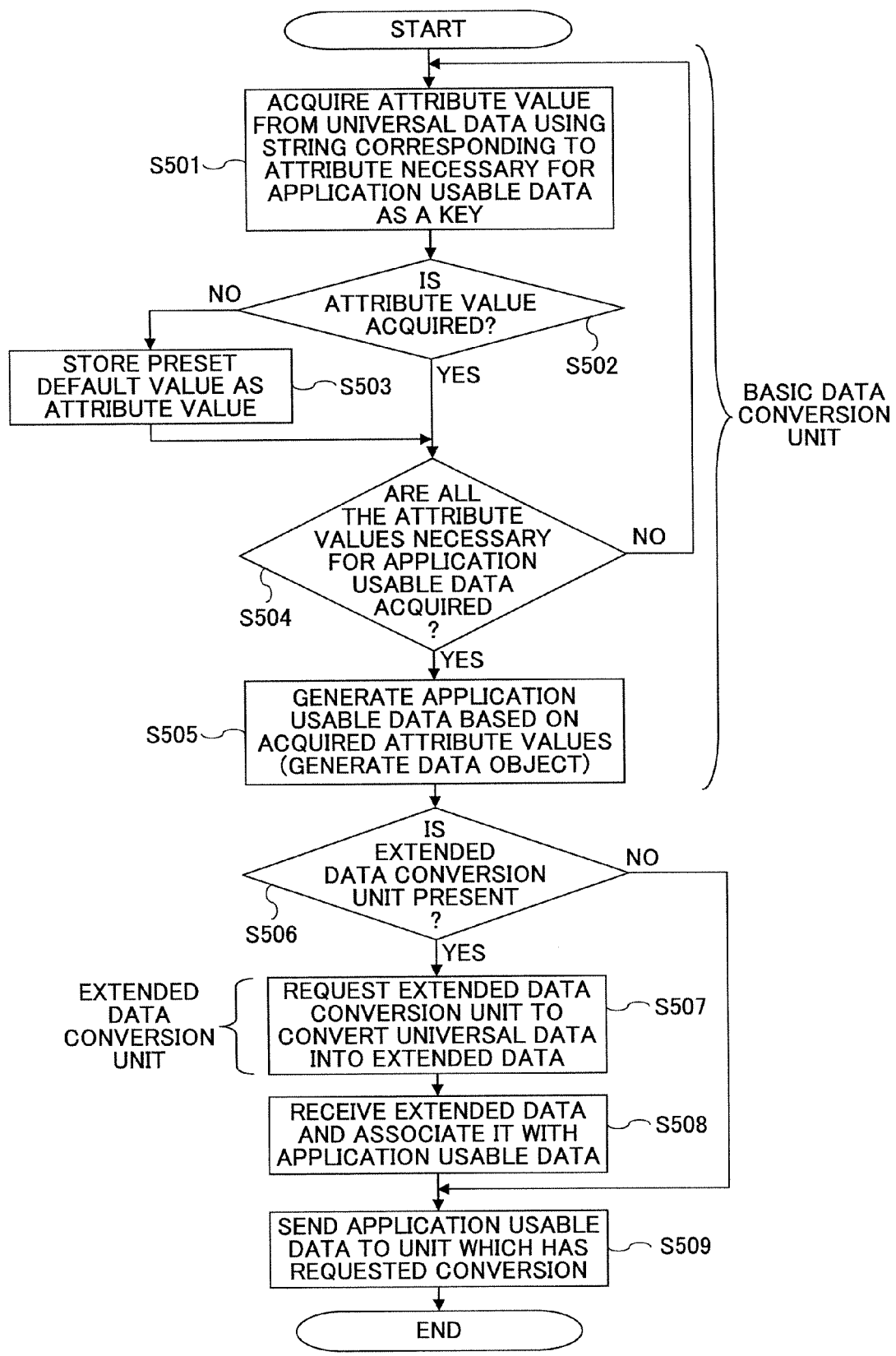
FIG. 18 is a flowchart showing a procedure (for converting universal data into application usable data) taken by an application usable data conversion unit of the information processing apparatus according to the first embodiment of the present invention.

FIG. 18 is a flowchart showing a procedure (for converting the universal data 53 into the application usable data 52) taken by the application usable data conversion unit 622 of the information processing apparatus 100 according to the first embodiment of the present invention.

The application usable data conversion unit 622 acquires an attribute value from the universal data 53 using a string corresponding to the attribute necessary for application usable data 52 as a key (S501), and determines whether the acquisition of the attribute value is successful (S502).

If the acquisition of the attribute value fails (NO in S502), the application usable data conversion unit 622 determines that the attribute value does not exist and therefore stores a preset default value as the attribute value (S503). If the acquisition of the attribute value is successful (YES in S502), the procedure proceeds to the next step.

The application usable data conversion unit 622 determines whether all the attribute values necessary for the application usable data 52 are acquired (S504).

If not all the attribute values necessary for the application usable data 52 are acquired yet (NO in S504), the steps S501-S503 are repeated. If all the attribute values necessary for the application usable data 52 are acquired (YES in S504), the application usable data 52 are generated based on the acquired attribute values (S505).

Then the application usable data conversion unit 622 determines whether there is an extended data conversion unit 6222 for converting the universal data 53 into the extended data 522 of the application usable data 52 in process (S506).

If the extended data conversion unit 6222 exists (YES in S506), the extended data conversion unit 6222 is requested to convert the universal data 53 into the extended data 522 (S507). The application usable data conversion unit 622 receives the extended data 522 from the extended data conversion unit 6222, and associates the extended data 522 with the application usable data 52 (S508).

If the extended data conversion unit 6222 does not exist (NO in S506), the steps S507 and S508 are skipped.

Then the generated application usable data 52 are sent to the data type determination unit 621 which has requested the conversion (S509).

Figure 19:
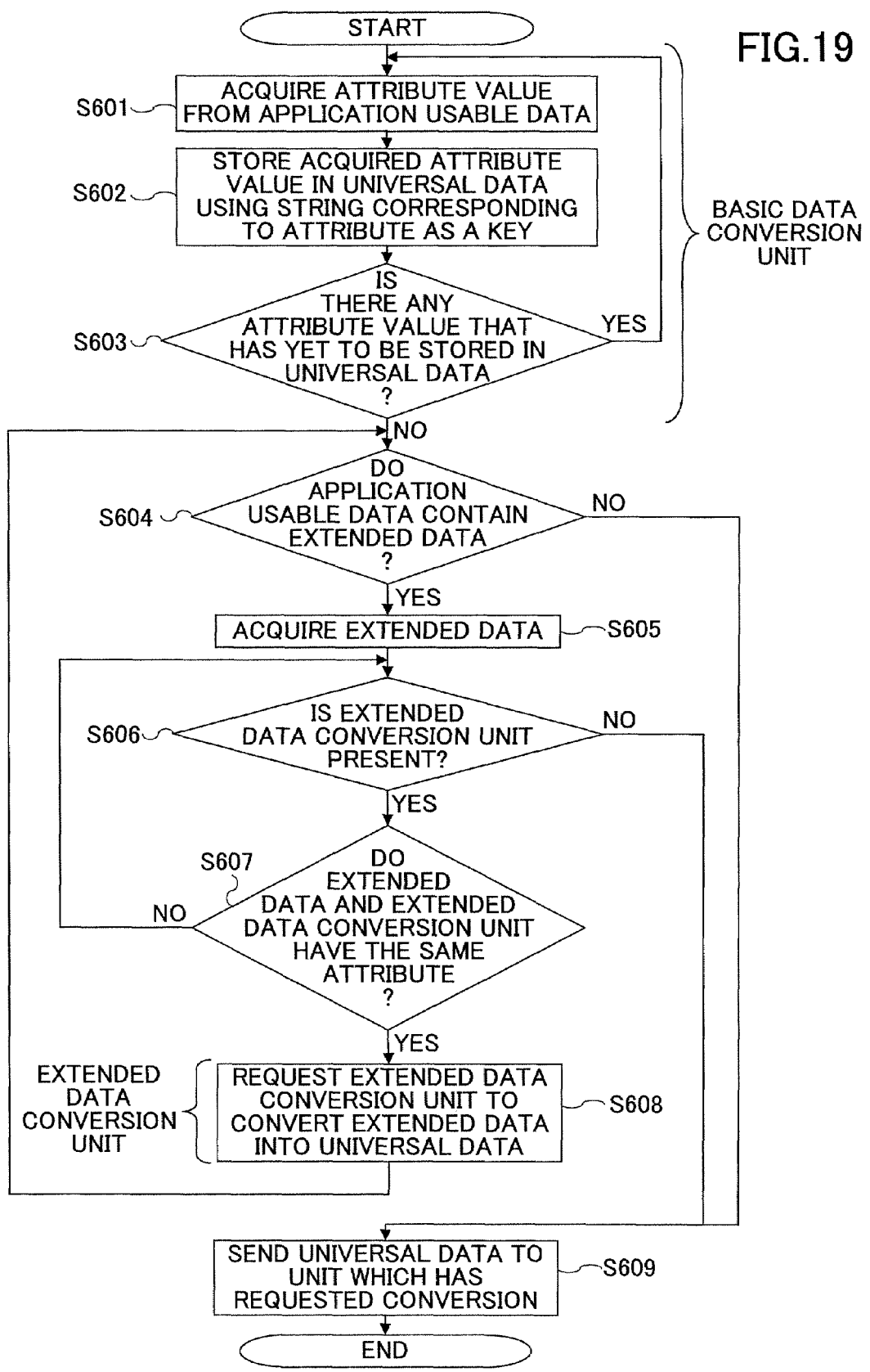
FIG. 19 is a flowchart showing a procedure (for converting application usable data into universal data) taken by an application usable data conversion unit of the information processing apparatus according to the first embodiment of the present invention.

FIG. 19 is a flowchart showing a procedure (for converting the application usable data 52 into the universal data 53) taken by the application usable data conversion unit 622 of the information processing apparatus 100 according to the first embodiment of the present invention.

The application usable data conversion unit 622 acquires an attribute value from the application usable data 52 (S601), stores the acquired attribute value in the universal data 53 using a string corresponding to the attribute as a key (S602), and determines whether there is an attribute value yet to be stored in the universal data 53 (S603).

If there is an attribute value that has yet to be stored in the universal data 53 (YES in S603), the steps S601 and S602 are repeated. If all the attribute values are stored in the universal data 53 and thus there is no attribute value that has yet to be stored in the universal data 53, the application usable data conversion unit 622 determines whether the application usable data 52 contain the extended data 522 (S604).

If the application usable data 52 contain the extended data 522 (YES in S604), the application usable data conversion unit 622 acquires the extended data 522 (S605). Then the application usable data conversion unit 622 determines whether there is an extended data conversion unit 6222 for conversing the acquired extended data 522 into the universal data 53 (S606).

If the extended data conversion unit 6222 exists (S606), the application usable data conversion unit 622 determines whether the extended data 522 and the data attribute of the extended data conversion unit 6222 have the same data attribute (i.e., determines whether the extended data conversion unit 6222 is capable of converting the extended data 522) (S607).

If the data attributes are the same and therefore the extended data conversion unit 6222 is capable of converting the extended data 522 (YES in S607), the extended data conversion unit 6222 is requested to convert the universal data 53 into the extended data 522 (S608). If the data attributes are different from each other and therefore the extended data conversion unit 6222 is not capable of converting the extended data 522 (NO in S607), another extended data conversion unit 6222 is examined (i.e., the process returns to the step S606).

If the extended data conversion unit 6222 does not exist (NO in S606), the steps S607 and S608 are not executed. Then the generated universal data 53 are sent to the data type determination unit 621 which has requested the conversion (S609).

If the application usable data 52 do not contain the extended data 522 (NO in S604), the steps S605-S608 are not executed. Then the generated universal data 53 are sent to the data type determination unit 621 which has requested the conversion (S609).

The above-described processing procedures taken by the components of this embodiment may be provided in the form of a computer readable program so as to realize the data conversion function (data I/F function) capable of easily responding to a data structure change between the system acquisition data 54 and the application usable data 52. A data conversion program including program codes for performing the processing procedures taken by the components of the present embodiment may be stored in a computer-readable medium.

Data conversion methods for the respective data manipulation operations are described below with reference to sequence diagrams of FIGS. 20 though 32.

Figure 20:
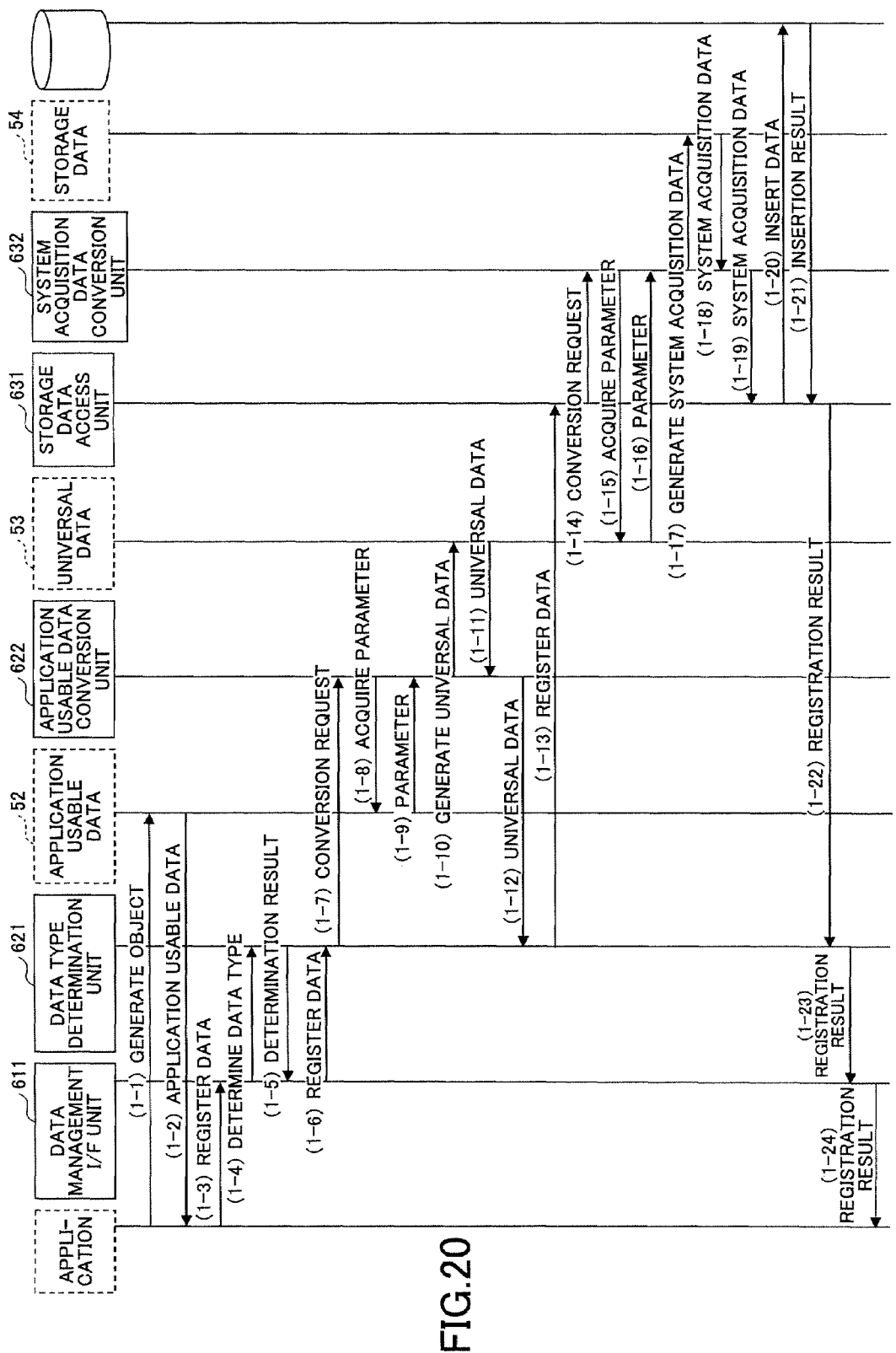
FIG. 20 is a sequence diagram showing a data conversion method (for data registration) in the information processing apparatus according to the first embodiment of the present invention.

Data Conversion Methods for the Respective Data Manipulation Operations in the Present Embodiment FIG. 20 is a sequence diagram showing a data conversion method (for data registration) in the information processing apparatus 100 according to the first embodiment of the present invention.

The application generates an object for application usable data 52 in the RAM and acquires item names and item values (1-1). Then the application acquires the application usable data 52 to be registered (1-2). For the purpose of data registration, the application calls the data management I/F unit 611 and passes the data type and the application usable data 52 to the data management I/F unit 611 (1-3).

In order to determine whether the data type of the data to be registered is appropriate, the data management I/F unit 611 passes the data type to the data type determination unit 621 (1-4).

The data type determination unit 621 determines whether the data type of the to-be-registered data is appropriate based on the received data type and the data type of the storage location, and returns the determination result to the data management I/F unit 611 (1-5).

If the received determination result indicates that the data type of the to-be-registered data is appropriate, the data management I/F unit 611 sends a data registration request to the data type determination unit 621 (1-6).

In response to the data registration request, the data type determination unit 621 passes the application usable data 52 to the application usable data conversion unit 622 in order to convert the application usable data 52 into the universal data 53 (1-7).

The application usable data conversion unit 622 acquires attribute names and attribute values of the received application usable data 52 (1-8 and 1-9), and stores values in item names and item values in the universal data 53 based on the acquired attribute names and attribute values, thereby generating the universal data 53 (1-10). The application usable data conversion unit 622 acquires the generated universal data 53 (1-11), and sends the acquired universal data 53 to the data type determination unit 621 (1-12).

For the purpose of data registration, based on the universal data 53, the data type determination unit 621 sends the data type and the universal data 53 to the storage data access unit 631 (1-13).

In response to the data registration request, the storage data access unit 631 passes the data type and the universal data 53 to the system acquisition data conversion unit 632 in order to convert the universal data 53 into the system acquisition data 54 (1-14).

The system acquisition data conversion unit 632 acquires the item names and the item values of the received universal data 53 (1-15 and 1-16), and stores values in attribute names and attribute values of the system acquisition data 54 based on the acquired item names and item values, thereby generating the system acquisition data 54 (1-17). The system acquisition data conversion unit 632 acquires the generated system acquisition data 54 (1-18), and sends the acquired system acquisition data 54 to the storage data access unit 631 (1-19).

The storage data access unit 631 registers (inserts) the received system acquisition data 54 into a data area of the storage location, and receives the result indicating whether the data registration is successful (1-20 and 1-21).

The storage data access unit 631 sends the received data registration result to the data type determination unit 621 (1-21), and then the registration result is sent to the application via the data type determination unit 621 and the data management I/F unit 611 (1-22 and 1-23).

Figure 21:
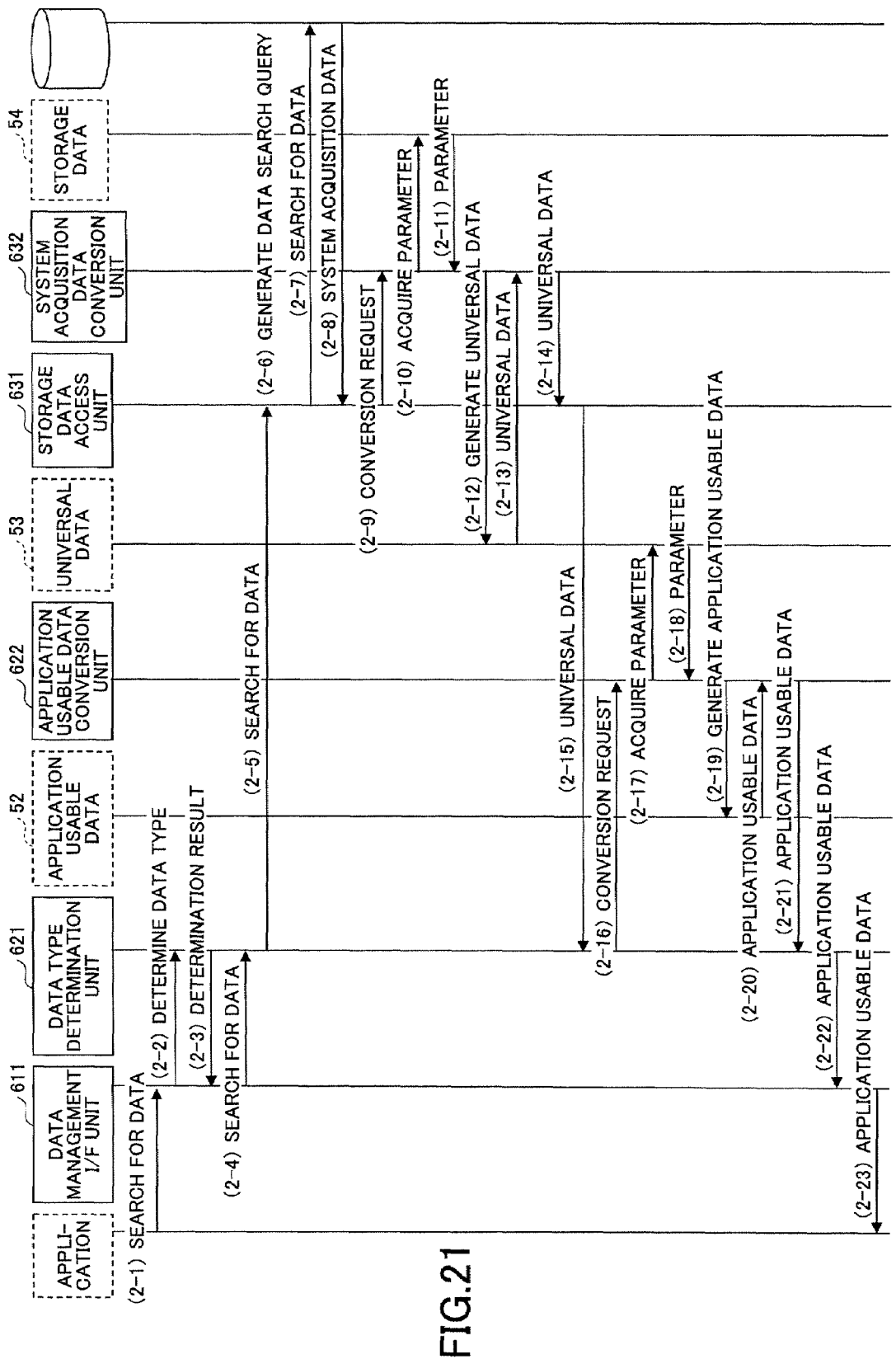
FIG. 21 is a sequence diagram showing a data conversion method (for data search) in the information processing apparatus according to the first embodiment of the present invention.

FIG. 21 is a sequence diagram showing a data conversion method (for data search) in the information processing apparatus 100 according to the first embodiment of the present invention.

For the purpose of data search, the application calls the data management I/F unit 611 and passes a data type and a search condition to the data management I/F unit 611 (2-1).

In order to determine whether the data type of the data to be searched for is appropriate, the data management I/F unit 611 passes the data type to the data type determination unit 621 (2-2).

The data type determination unit 621 determines whether the data type of the to-be-searched-for data is appropriate based on the received data type and the data type of the storage location, and returns the determination result to the data management I/F unit 611 (2-3).

If the received determination result indicates that the data type of the to-be-searched for data is appropriate, the data management I/F unit 611 sends a data search request to the data type determination unit 621 (2-4).

In response to the data search request, the data type determination unit 621 passes the data type and the search condition to the storage data access unit 631 in order to search for the system acquisition data 54 in the storage location (2-5).

Figure 22:
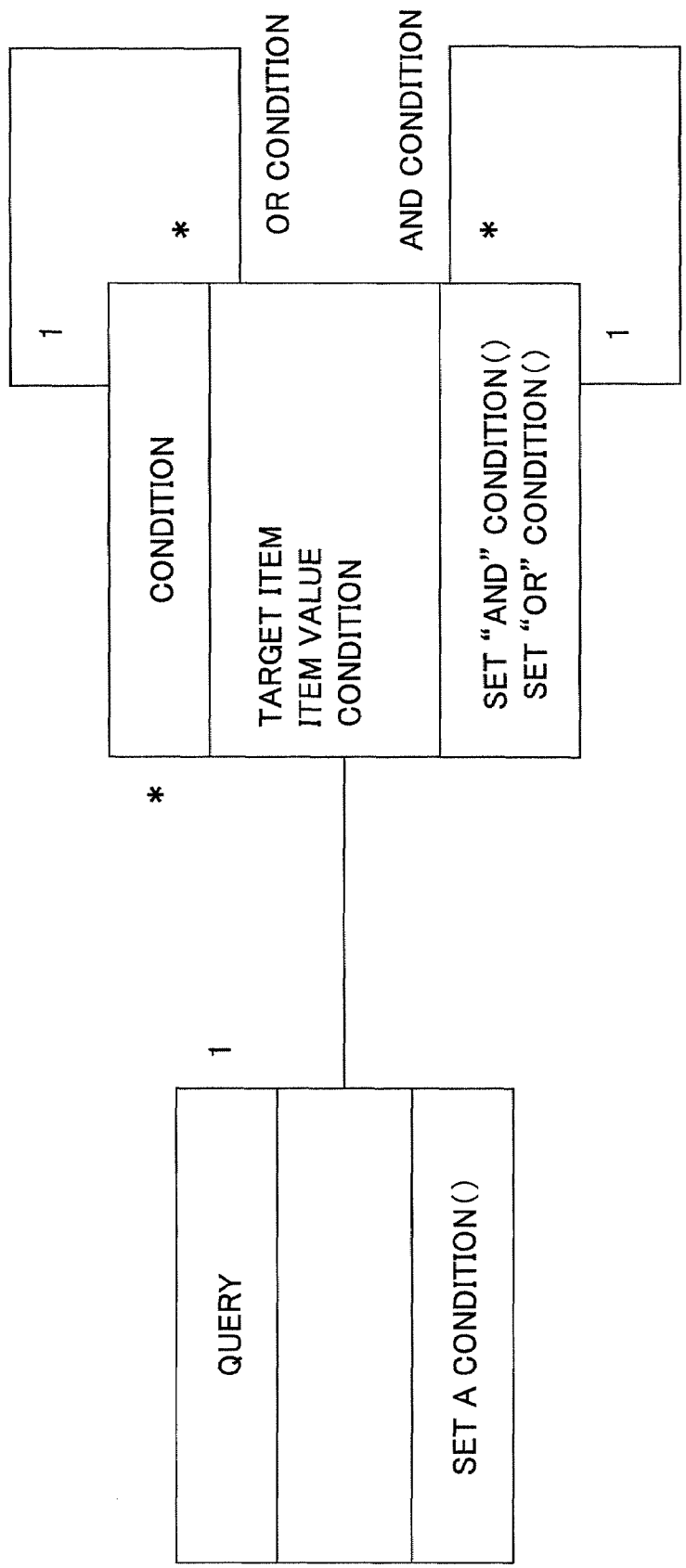
FIG. 22 is a diagram illustrating an example of a data search query (a search query for an object-oriented DB) in the information processing apparatus according to the first embodiment of the present invention.

The storage data access unit 631 generates a data search query (search query for an object-oriented DB) as shown in FIG. 22 based on the received search condition, and searches for the system acquisition data 54 in the storage location according to the generated search query (2-7). Thus the storage data access unit 631 acquires the system acquisition data 54 satisfying the search condition (2-8), and passes the data type and the system acquisition data 54 to the system acquisition data conversion unit 632 in order to convert the acquired system acquisition data 54 into the universal data 53 (2-9).

The system acquisition data conversion unit 632 acquires attribute names and attribute values of the received system acquisition data 54 (2-10 and 2-11), and stores values in item names and item values in the universal data 53 based on the acquired attribute names and attribute values, thereby generating the universal data 53 (2-12). The system acquisition data conversion unit 632 acquires the generated universal data 53 (2-13), and sends the acquired universal data 53 to the storage data access unit 631 (2-14).

The storage data access unit 631 passes the received universal data 53 to the data type determination unit 621 (2-15). The data type determination unit 621 passes the universal data 53 to the application usable data conversion unit 622 in order to convert the received universal data 53 into the application usable data 52 (2-16).

The application usable data conversion unit 622 acquires the item names and the item values of the received universal data 53 (2-17 and 2-18), and stores values in attribute names and attribute values of the application usable data 52 based on the acquired item names and item values (2-19). The application usable data conversion unit 622 acquires the generated application usable data 52 (2-20), and sends the acquired application usable data 52 to the data type determination unit 621 (2-21).

The data type determination unit 621 passes the received application usable data 52 to the application via the data management I/F unit 611 (2-22 and 2-23).

Figure 23:
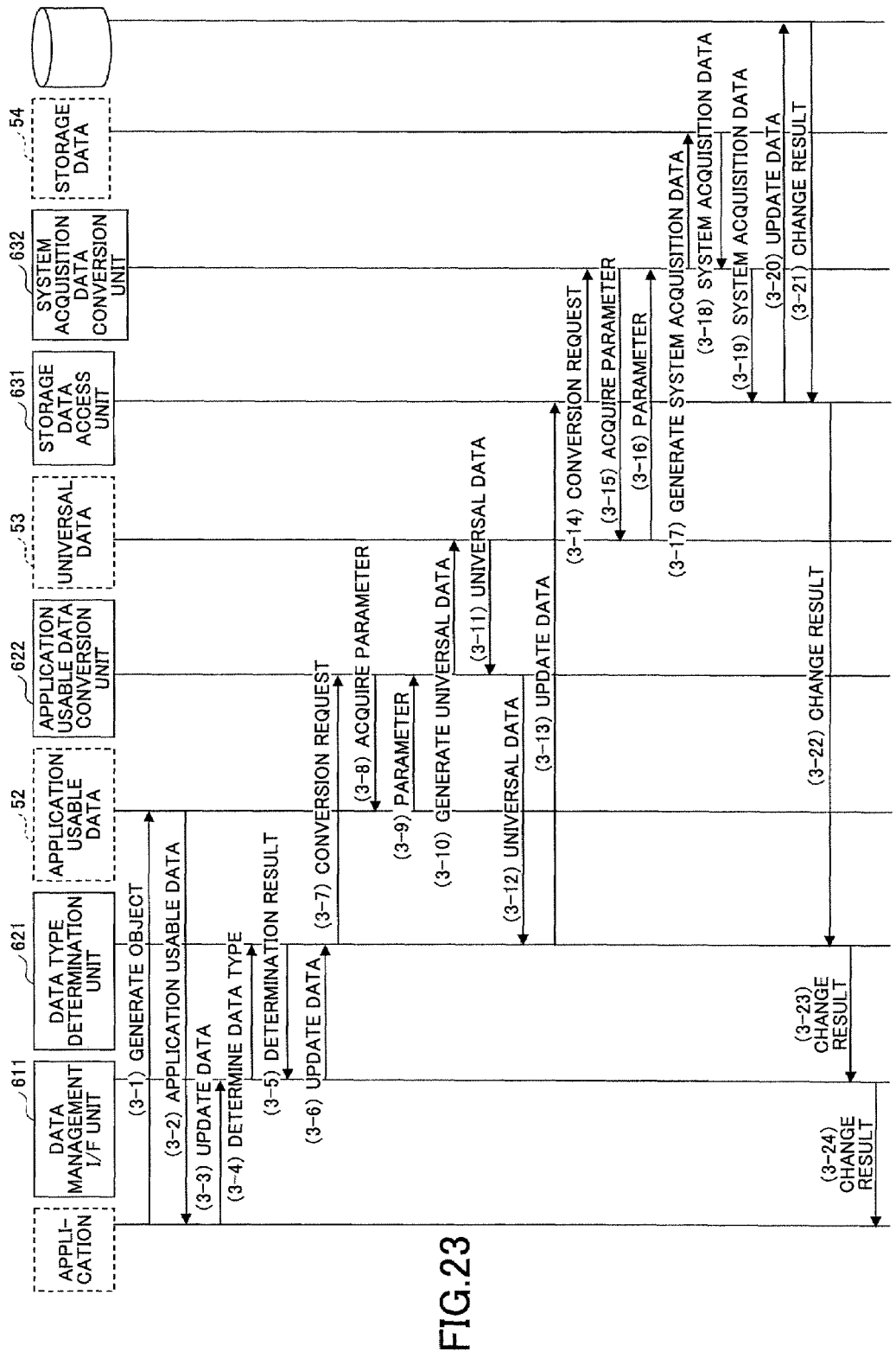
FIG. 23 is a sequence diagram showing a data conversion method (for data update) in the information processing apparatus according to the first embodiment of the present invention.

FIG. 23 is a sequence diagram showing a data conversion method (for data update) in the information processing apparatus 100 according to the first embodiment of the present invention.

The application generates an object for application usable data 52 in the RAM and acquires item names and item values (3-1). Then the application acquires the application usable data 52 to be updated (3-2). For the purpose of data update, the application calls the data management I/F unit 611 and passes the data type, the application usable data 52, and the item to be updated to the data management I/F unit 611 (3-3).

In order to determine whether the data type of the data to be updated is appropriate, the data management I/F unit 611 passes the data type to the data type determination unit 621 (3-4).

The data type determination unit 621 determines whether the data type of the to-be-updated data is appropriate based on the received data type and the data type of the storage location, and returns the determination result to the data management I/F unit 611 (3-5).

If the received determination result indicates that the data type is appropriate, the data management I/F unit 611 sends a data update request to the data type determination unit 621 (3-6).

In response to the data update request, the data type determination unit 621 passes the application usable data 52 to the application usable data conversion unit 622 in order to convert the application usable data 52 into the universal data 53 (3-7).

The application usable data conversion unit 622 acquires attribute names and attribute values of the received application usable data 52 (3-8 and 3-9), and stores values in item names and item values in the universal data 53 based on the acquired attribute names and attribute values, thereby generating the universal data 53 (3-10). The application usable data conversion unit 622 acquires the generated universal data 53 (3-11), and sends the acquired universal data 53 to the data type determination unit 621 (3-12).

For the purpose of data update, based on the universal data 53, the data type determination unit 621 sends the data type, the universal data 53, and the to-be-updated item to the storage data access unit 631 (3-13).

In response to the data update request, the storage data access unit 631 passes the data type, the universal data 53, and the to-be-updated item to the system acquisition data conversion unit 632 in order to convert the universal data 53 into the system acquisition data 54 (3-14).

The system acquisition data conversion unit 632 acquires the item names and the item values of the received universal data 53 (3-15 and 3-16), and stores values in attribute names and attribute values of the system acquisition data 54 based on the acquired item names and item values (3-17). The system acquisition data conversion unit 632 acquires the generated system acquisition data 54 (3-18), and sends the acquired system acquisition data 54 to the storage data access unit 631 (3-19).

The storage data access unit 631 updates (changes) data in a data area of the storage location based on the received system acquisition data 54, and receives the result indicating whether the data update is successful (3-20 and 3-21).

The storage data access unit 631 sends the received data update result to the data type determination unit 621 (3-22), and then the registration result is sent to the application via the data type determination unit 621 and the data management I/F unit 611 (3-23 and 3-24).

Figure 24:
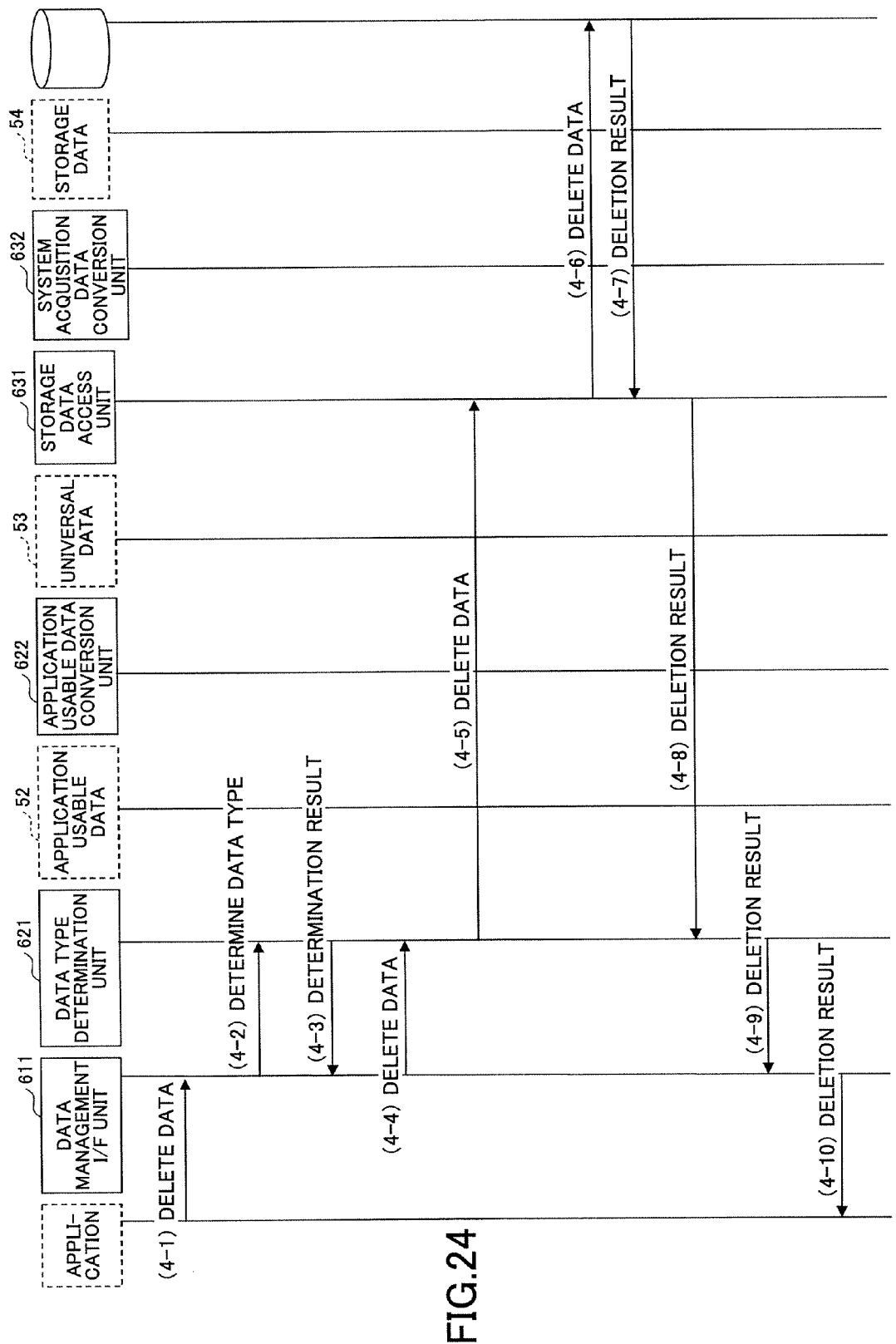
FIG. 24 is a sequence diagram showing a data conversion method (for data deletion) in the information processing apparatus according to the first embodiment of the present invention.

FIG. 24 is a sequence diagram showing a data conversion method (for data deletion) in the information processing apparatus 100 according to the first embodiment of the present-invention.

For the purpose of data deletion, the application calls the data management I/F unit 611 and passes the data type and an identifier (which is an ID number contained in the application usable data 52) to the data management I/F unit 611 (4-1).

In order to determine whether the data type of the data to be deleted is appropriate, the data management I/F unit 611 passes the date type to the data type determination unit 621 (4-2).

The data type determination unit 621 determines whether the data type of the to-be-deleted data is appropriate based on the received data type and the data type of the storage location, and returns the determination result to the data management I/F unit 611 (4-3).

If the received determination result indicates that the data type is appropriate, the data management I/F unit 611 sends a data deletion request to the data type determination unit 621 (4-4).

In response to the data deletion request, the data type determination unit 621 passes the data type and the identifier to the storage data access unit 631 in order to delete the to-be-deleted system acquisition data 54 in the storage location (4-5).

The storage data access unit 631 deletes the to-be-deleted system acquisition data 54 in the storage location based on the received data type and the identifier (4-6), and receives the deletion result (4-7).

The storage data access unit 631 passes the received deletion result to the application via the data type determination unit 621 and the data management I/F unit 611 (4-8 and 4-9).

Figure 25:
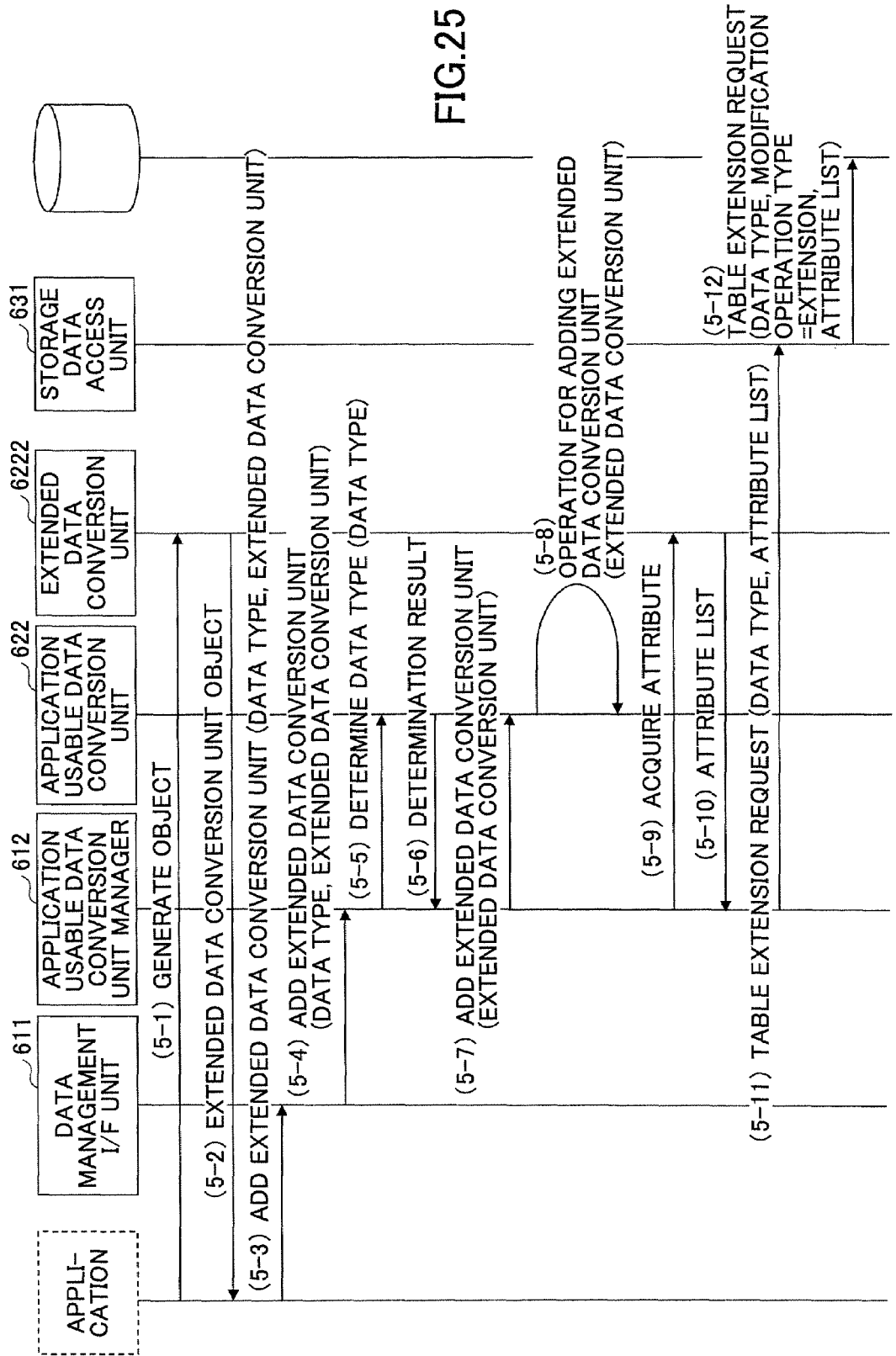
FIG. 25 is a sequence diagram showing a data conversion method (for adding extended data) in the information processing apparatus according to the first embodiment of the present invention.

FIG. 25 is a sequence diagram showing a data conversion method (for adding extended data 522) in the information processing apparatus 100 according to the first embodiment of the present invention.

The application generates in the RAM an extended data conversion unit 622 object for the application usable data conversion unit 622 for conversion between application specific extended data 522 (e.g. FAX information, e-mail information) and universal data 53 (5-1), and acquires the generated object (5-2). In order to add the extended data 522 to the application usable data 52, the application passes the data type and the extended data conversion unit 6222 object to the data management I/F unit 611 (5-3).

The data management I/F unit 611 passes the received data type and extended data conversion unit 6222 object to the application usable data converter management unit 612 (5-4). The application usable data converter management unit 612 passes the data type to the application usable data conversion unit 622 so as to determine the data type of the to-be-added extended data conversion unit 6222 object (5-5).

The application usable data conversion unit 622 determines whether the data type is appropriate as yet-to-be-registered extended data 522 based on the received data type, and returns the determination result to the application usable data converter management unit 612 (5-6).

If the determination result indicates that the data type is appropriate, the application usable data converter management unit 612 passes the extended data conversion unit 6222 object to the application usable data conversion unit 622 in order to add the extended data conversion unit 6222 object to the application usable data conversion unit 622 (5-7).

The application usable data conversion unit 622 adds the received extended data conversion unit 6222 object to the application usable data conversion unit 622 (5-8).

The application usable data converter management unit 612 sends a request for acquisition of the attribute names and the attribute values of the extended data 522 to the extended data conversion unit 6222 added to the application usable data conversion unit 622 (5-9), and acquires the result as an attribute list (5-10).

Based on the acquired attribute list from the extended data conversion unit 6222, the application usable data converter management unit 612 passes the data type and the attribute list to the storage data access unit 631 in order to request for extension of a table for the extended data 522 in the storage location (5-11).

In response to the request, the storage data access unit 631 sends a request for a data table extension to the storage location based on the data type, the type of the modification operation "extension", and the attribute list (5-12). As a result, an object for data access in the storage location extends a data table corresponding to the extended data conversion unit 6222 object, which has been added to the application usable data conversion unit 622, based on the modification operation type "extension".

Figure 26:
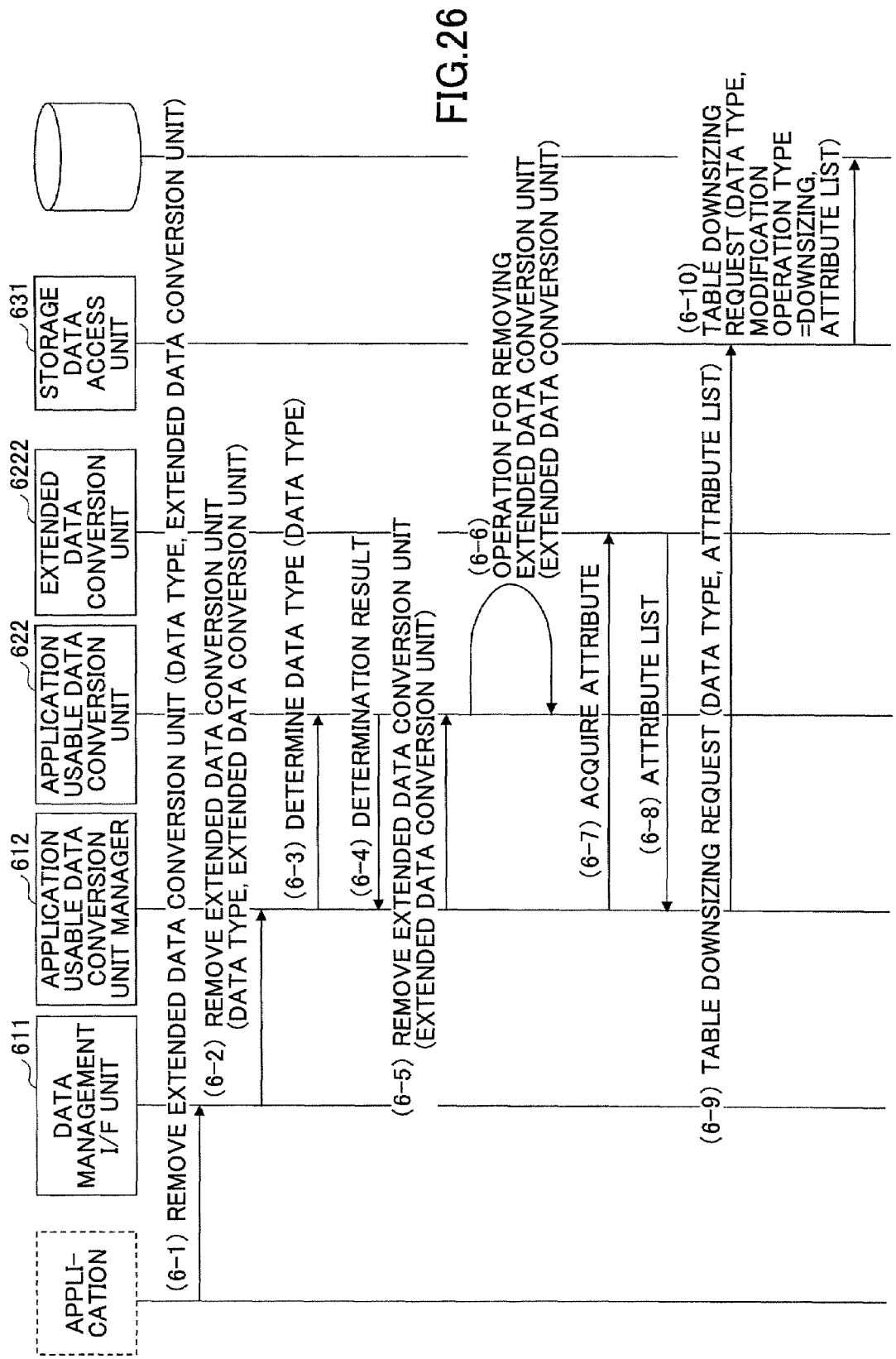
FIG. 26 is a sequence diagram showing a data conversion method (for deleting basic data) in the information processing apparatus according to the first embodiment of the present invention.

FIG. 26 is a sequence diagram showing a data conversion method (for deletion of extended data 522) in the information processing apparatus 100 according to the first embodiment of the present invention.

In order to delete the extended data 522 which has been added to the application usable data 52, the application passes the data type and the extended data conversion unit 6222 object to the data management I/F unit 611 (6-1).

The data management I/F unit 611 passes the received data type and extended data conversion unit 6222 object to the application usable data converter management unit 612 (6-2). The application usable data converter management unit 612 passes the data type to the application usable data conversion unit 622 so as to determine the data type of the to-be-removed extended data conversion unit 6222 object (6-3).

The application usable data conversion unit 622 determines whether the data type is appropriate as registered extended data 522 based on the received data type, and returns the determination result to the application usable data converter management unit 612 (6-4).

If the determination result indicates that the data type is appropriate, the application usable data converter-management unit 612 passes the extended data conversion unit 6222 object to the application usable data conversion unit 622 in order to remove the extended data conversion unit 6222 object to the application usable data conversion unit 622 (6-5).

The application usable data conversion unit 622 deletes the received extended data conversion unit 6222 object from the application usable data conversion unit 622 (6-6).

The application usable data converter management unit 612 sends a request for acquisition of the attribute names and the attribute values of the extended data 522 to the extended data conversion unit 6222 that is currently registered in the application usable data conversion unit 622 (6-7), and acquires the result as an attribute list (6-8).

Based on the acquired attribute list from the extended data conversion unit 6222, the application usable data converter management unit 612 passes the data type and the attribute list to the storage data access unit 631 in order to request downsizing of a table for the extended data 522 in the storage location (6-9).

In response to the request, the storage data access unit 631 sends a request for a data table downsizing to the storage location based on the data type, the type of the modification operation "downsizing", and the attribute list (6-10). As a result, an object for data access in the storage location downsizes a data table corresponding to the extended data conversion unit 6222 object, which has been deleted from the application usable data conversion unit 622, based on the modification operation type "downsizing".

Figure 27:
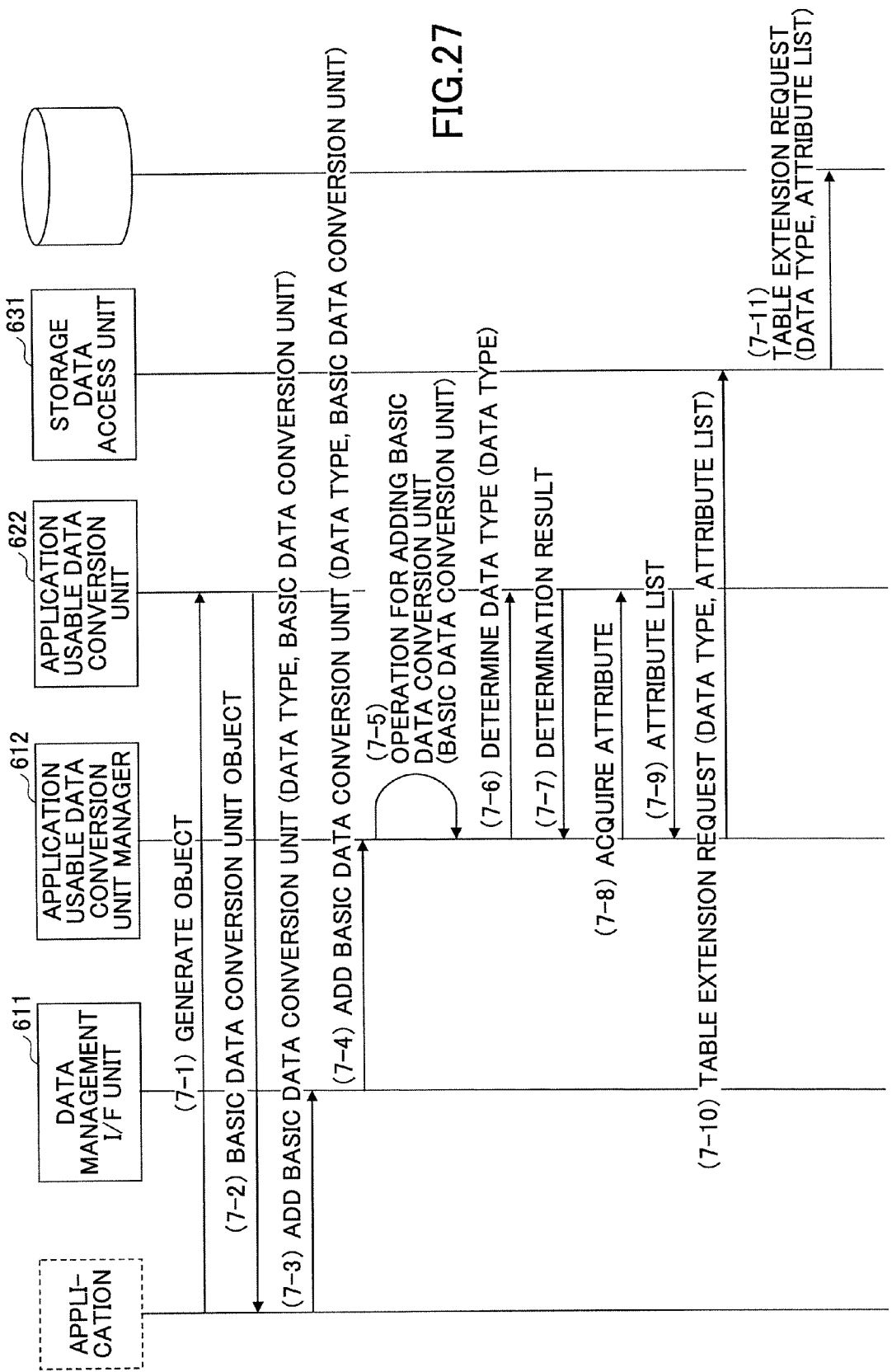
FIG. 27 is a sequence diagram showing a data conversion method (for adding basic data) in the information processing apparatus according to the first embodiment of the present invention.

FIG. 27 is a sequence diagram showing a data conversion method (for adding basic data 521) in the information processing apparatus 100 according to the first embodiment of the present invention.

The application generates in the RAM a basic data conversion unit 6221 object for the application usable data conversion unit 622 for conversion between the basic data 521 (e.g.

user name, furigana) of the application and universal data 53 (7-1), and acquires the generated object (7-2). In order to add the basic data 521 to the application usable data 52, the application passes the data type and the basic data conversion unit 6221 object to the data management I/F unit 611 (7-3).

The data management I/F unit 611 passes the received data type and basic data conversion unit 6221 object to the application usable data converter management unit 612 (7-4).

The application usable data converter management unit 612 adds the received basic data conversion unit 6221 object as the application usable data conversion unit 622 (7-5). The application usable data converter management unit 612 passes the data type to the application usable data conversion unit 622 so as to determine the data type of the added basic data conversion unit 6221 object (7-6).

The application usable data conversion unit 622 determines whether the data type is appropriate as registered basic data 521 based on the received data type, and returns the determination result to the application usable data converter management unit 612 (7-4).

If the determination result indicates that the data type is appropriate, the application usable data converter management unit 612 sends a request for acquisition of the attribute names and the attribute values of the basic data 521 to the added application usable data conversion unit 622 (7-8), and acquires the result as an attribute list (7-9). Based on the acquired attribute list from the application usable data conversion unit 622, the application usable data converter management unit 612 passes the data type and the attribute list to the storage data access unit 631 in order to request for creation of a table for the basic data 521 in the storage location (7-10).

In response to the request, the storage data access unit 631 sends a request for a data table creation to the storage location based on the data type, the type of the modification operation "creation", and the attribute list (7-11). As a result, an object for data access in the storage location creates a data table corresponding to the added application usable data conversion unit 622 based on the modification operation type "creation".

Figure 28:
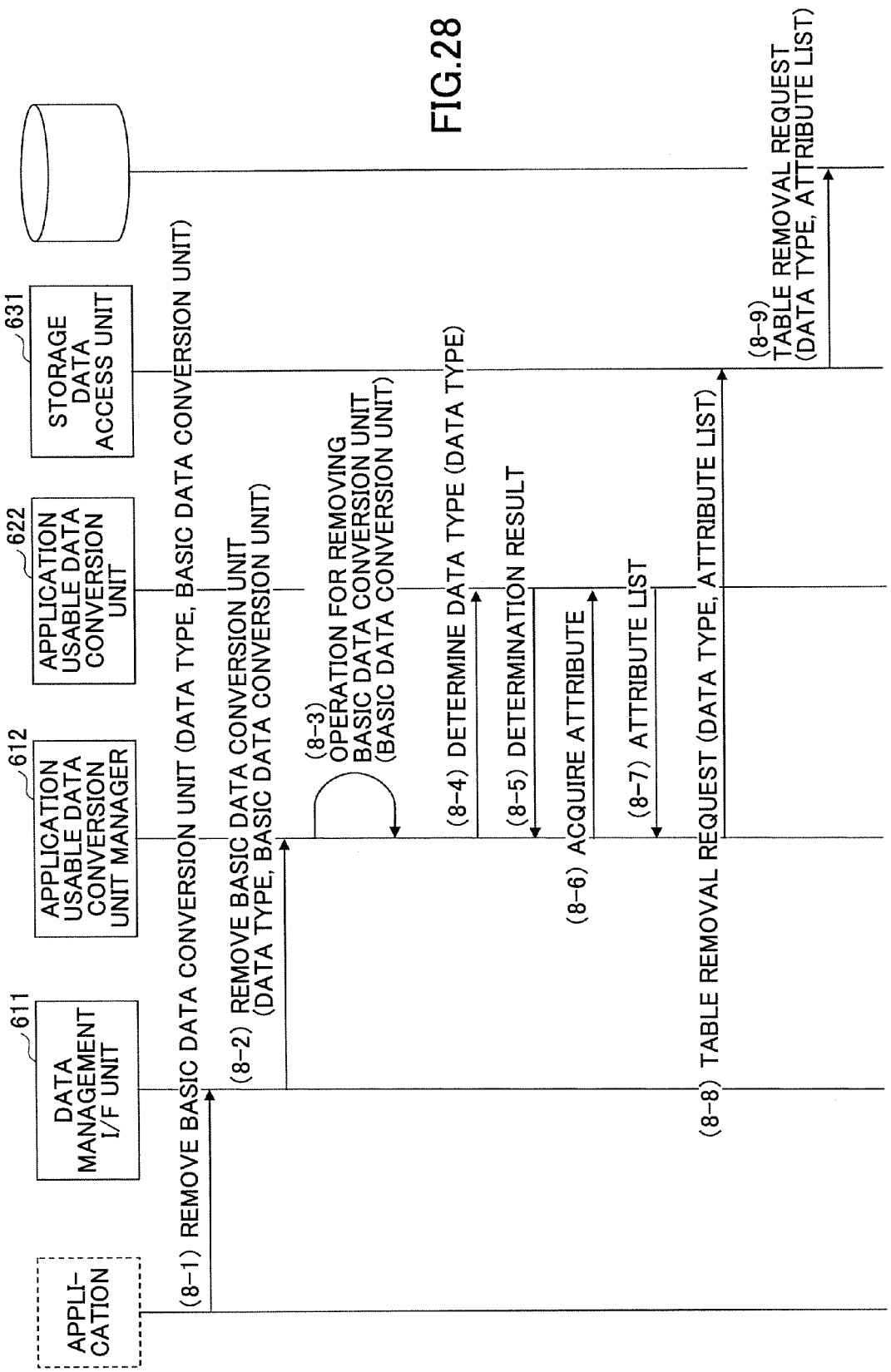
FIG. 28 is a sequence diagram showing a data conversion method (for deleting basic data) in the information processing apparatus according to the first embodiment of the present invention.

FIG. 28 is a sequence diagram showing a data conversion method (for deletion of basic data 521) in the information processing apparatus 100 according to the first embodiment of the present invention.

In order to delete the basic data 521 from the application usable data 52, the application passes the data type and the basic data conversion unit 6221 object to the data management I/F unit 611 (8-1).

The data management I/F unit 611 passes the received data type and basic data conversion unit 6221 object to the application usable data converter management unit 612 (8-2).

The application usable data converter management unit 612 removes, based on the received basic data conversion unit 6221 object, a corresponding application usable data conversion unit 622 (8-3). The application usable data converter management unit 612 passes the data type to the application usable data conversion unit 622 so as to determine the data type of the removed basic data conversion unit 6221 object (8-4).

The application usable data conversion unit 622 determines whether the data type is appropriate as registered basic data 521 based on the received data type, and returns the determination result to the application usable data converter management unit 612 (8-5).

If the determination result indicates that the data type is appropriate, the application usable data converter management unit 612 sends a request for acquisition of the attribute names and the attribute values of the basic data 521 to the currently registered application usable data conversion unit 622 (8-6), and acquires the result as an attribute list (8-7). Based on the acquired attribute list from the application usable data conversion unit 622, the application usable data converter management unit 612 passes the data type and the attribute list to the storage data access unit 631 in order to request removal of a table for the basic data 521 in the storage location (8-8).

In response to the request, the storage data access unit 631 sends a request for a data table removal to the storage location based on the data type, the type of the modification operation "removal", and the attribute list (8-9). As a result, an object for data access in the storage location removes a data table corresponding to the removed application usable data conversion unit 622 based on the modification operation type "removal".

Figure 29:
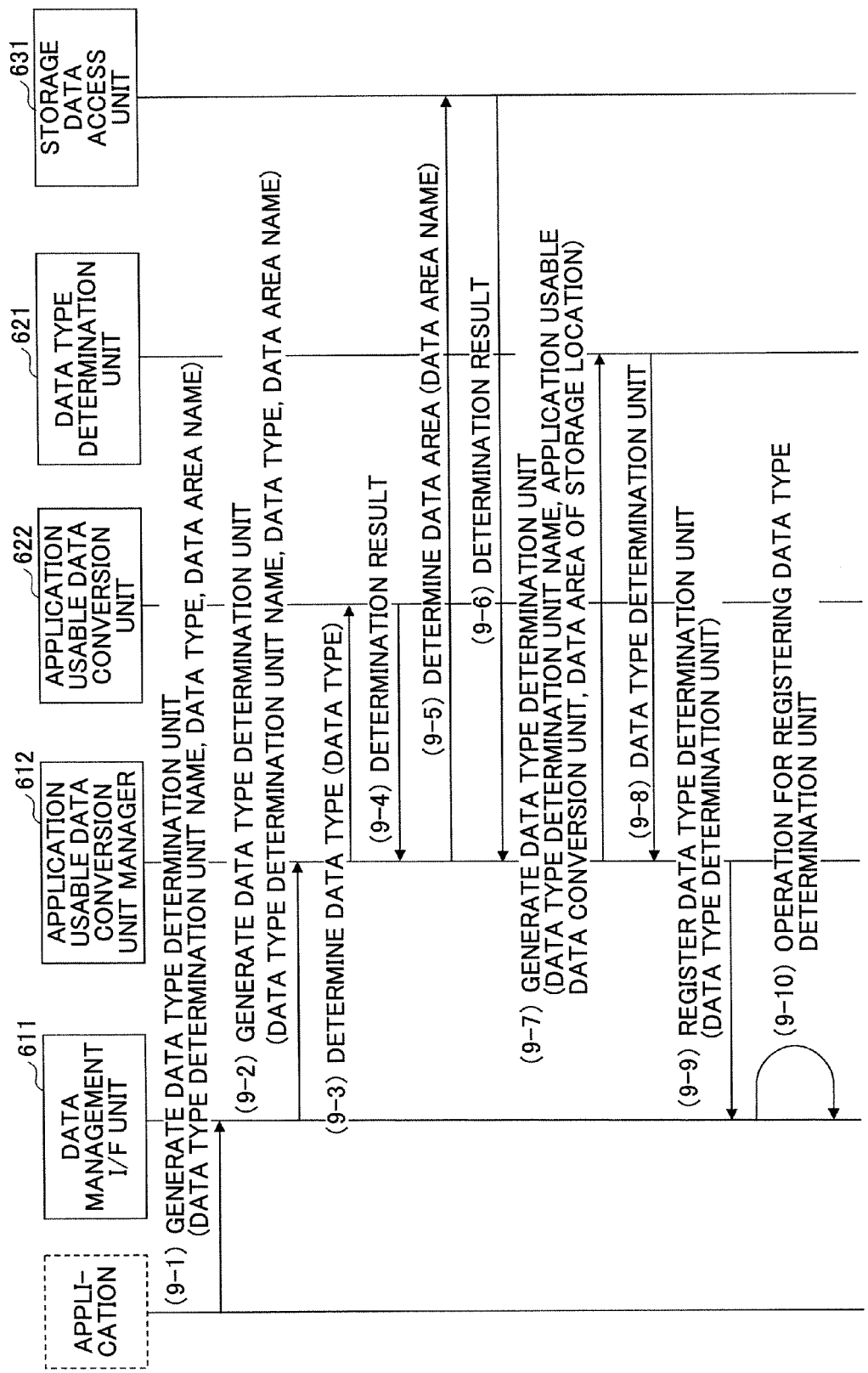
FIG. 29 is a sequence diagram showing a data conversion method (for adding a data type determination unit) in the information processing apparatus according to the first embodiment of the present invention.

FIG. 29 is a sequence diagram showing a data conversion method (for adding a data type determination unit 621) in the information processing apparatus 100 according to the first embodiment of the present invention.

In order to add a new data type determination unit 621 to the currently registered data type determination unit 621, the application passes the name of a data type determination unit 621 object, the data type to be determined by the to-be-added data type determination unit 621, and the name of a data area in the storage location (9-1).

The data management I/F unit 611 passes the received name of the data type determination unit 621 object, data type and area name to the application usable data converter management unit 612 (9-2).

The application usable data converter management unit 612 passes the data type to the application usable data conversion unit 622 so as to determine the data type to be determined by the to-be-added data type determination unit 621 (9-3).

The application usable data conversion unit 622 determines whether the data type is not registered yet based on the received data type, and returns the determination result to the application usable data converter management unit 612 (9-4).

If the determination result indicates that the data type is appropriate, the application usable data converter management unit 612 passes the data area name to the storage data access unit 631 (9-5).

Based on the received data area name, the storage data access unit 631 determines whether the corresponding data area is present in the storage location (9-5), and returns the determination result to the application usable data converter management unit 612 (9-6).

Based on the determination results acquired from the application usable data conversion unit 622 and the storage data access unit 631, the application usable data converter management unit 612 passes the name of the to-be-added data type determination unit 621 object, the application usable data conversion unit 622 object, and the data area of the storage location to the currently registered data type determination unit 621 so as to add the to-be-added data type determination unit 621 (9-7). Based on the received name of the to-be-added data type determination unit 621 object, application usable data conversion unit 622 object and data area of the storage location, the currently registered data type determination unit 621 creates the to-be-added data type determination unit 621 and sends it to the application usable data converter management unit 612 (9-8).

The application usable data converter management unit 612 passes the received data type determination unit 621 object to the data management I/F unit 611 (9-9).

The data management I/F unit 611 adds the received data type determination unit 621 object to the currently registered data type determination unit 621 (9-10).

Figure 30:
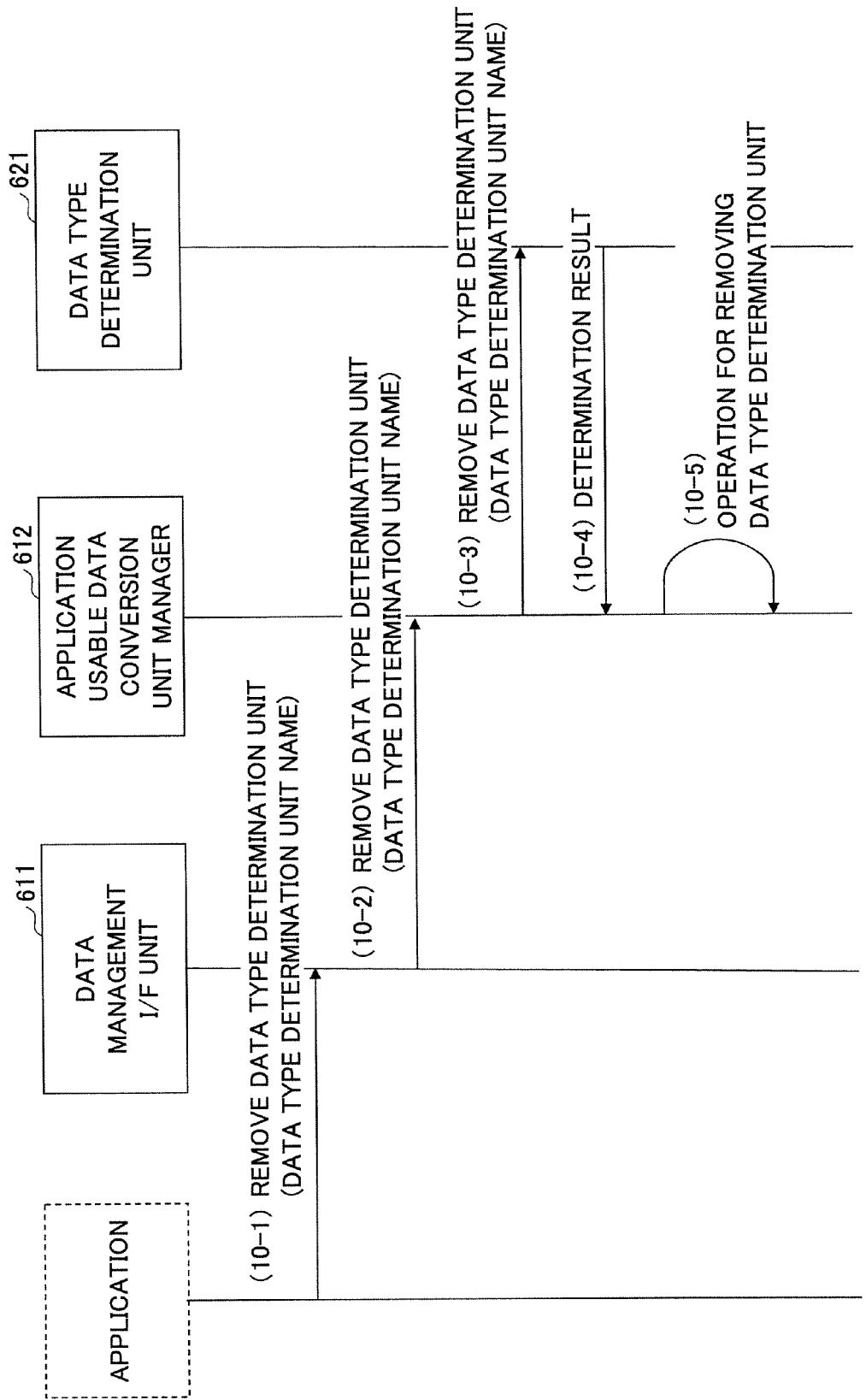
FIG. 30 is a sequence diagram showing a data conversion method (for removing a data type determination unit) in the information processing apparatus according to the first embodiment of the present invention.

FIG. 30 is a sequence diagram showing a data conversion method (for removing the data type determination unit 621) in the information processing apparatus 100 according to the first embodiment of the present invention.

In order to remove the added data type determination unit 621, the application passes the name of the data type determination unit 621 object to the data management I/F unit 611 (10-1).

The data management I/F unit 611 passes the received name of the data type determination unit 621 object to the application usable data converter management unit 612 (10-2).

The application usable data converter management unit 612 passes the received data type determination unit 621 object to the currently registered data type determination unit 621 (10-3).

The data type determination unit 621 determines whether the data type determination unit 621 corresponding to the received name of the data type determination unit 621 object is present, and returns the determination result to the application usable data converter management unit 612 (10-4).

If the determination result indicates that the data type determination unit 621 corresponding to the received name of the data type determination unit 621 object is present, the application usable data converter management unit 612 removes the data type determination unit 621 corresponding to the received name of the data type determination unit 621 object (10-5).

Figure 31:
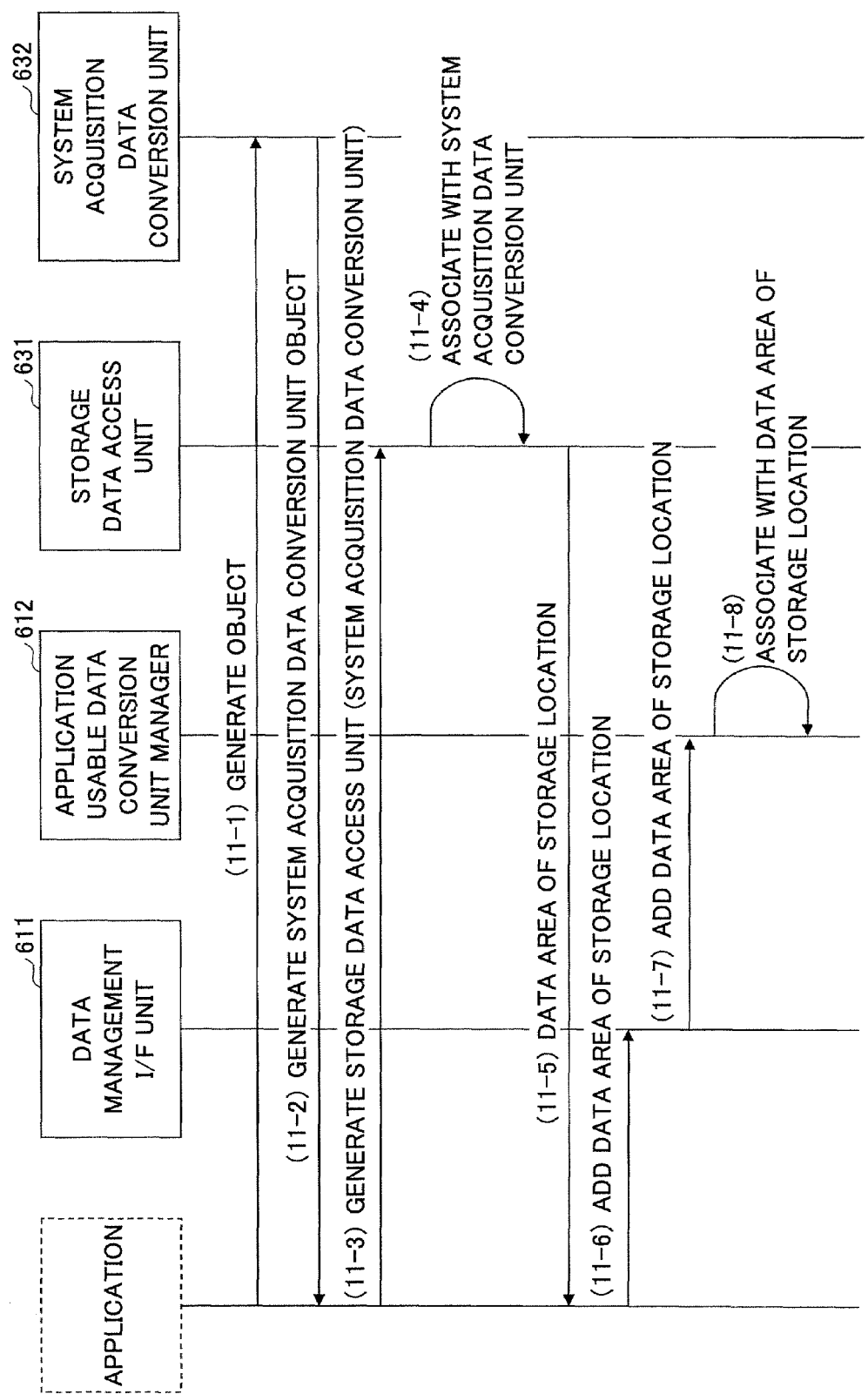
FIG. 31 is a sequence diagram showing a data conversion method (for adding a storage location) in the information processing apparatus according to the first embodiment of the present invention.

FIG. 31 is a sequence diagram showing a data conversion method (for adding the storage location) in the information processing apparatus 100 according to the first embodiment of the present invention.

The application generates in the RAM a system acquisition data conversion unit 632 object for conversion between the system acquisition data 54 acquired by system and the universal data 53 (11-1), and acquires the generated object (11-2). In order to associate the received system acquisition data conversion unit 632 object corresponding to a new storage location with the storage data access unit 631, the application passes the system acquisition data conversion unit 632 object to the current storage data access unit 631 (11-3).

The storage data access unit 631 associates itself with the received system acquisition data conversion unit 632 object (11-4), and returns the data area of the storage location to be accessed by the associated storage data access unit 631 to the application (11-5).

Based on the received data area of the storage location to be accessed by the storage data access unit 631, the application sends to the data management I/F unit 611 a request for association of the storage data access unit 631 with the to-be-accessed storage location (11-6).

The data management I/F unit 611 passes the received association request to the application usable data converter management unit 612 (11-7).

Based on the received data area of the storage location to be accessed by the storage data access unit 631, the application usable data converter management unit 612 associates the storage data access unit 631 with the to-be-accessed storage location (11-8).

Figure 32:
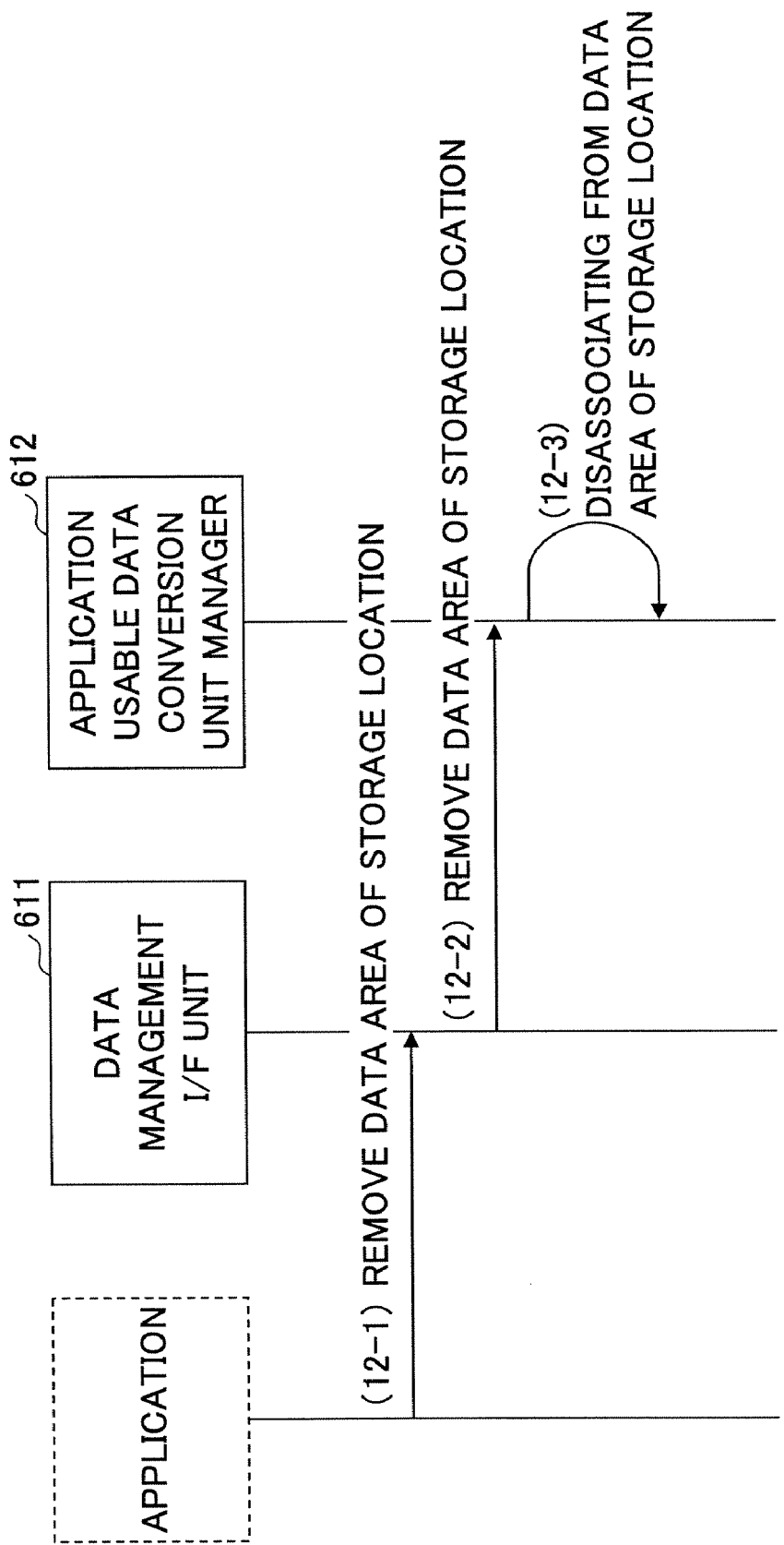
FIG. 32 is a sequence diagram showing a data conversion method (for deleting a storage location) in the information processing apparatus according to the first embodiment of the present invention.

FIG. 32 is a sequence diagram showing a data conversion method (for removing the storage location) in the information processing apparatus 100 according to the first embodiment of the present invention.

Based on the data area of the storage location to be accessed by the storage data access unit 631, the application sends to the data management I/F unit 611 a request for disassociation of the storage data access unit 631 from the to-be-accessed storage location (i.e. for breaking the association between the storage data access unit 631 and the to-be-accessed storage location) (12-1).

The data management I/F unit 611 passes the received disassociation request to the application usable data converter management unit 612 (12-2).

Based on the received data area of the storage location to be accessed by the storage data access unit 631, the application usable data converter management unit 612 disassociates the storage data access unit 631 from the to-be-accessed storage location (12-3).

As can be understood from the above description, according to the first embodiment of the present invention, the data conversion function includes the system acquisition data conversion unit 632 for conversion (interconversion) between the system acquisition data 54 and the universal data 53 that includes item names and item values independent of the data structures of the system acquisition data 54 and the application usable data 52, and the application usable data conversion unit 622 for conversion (interconversion) between the application usable data 54 and the universal data 53. The data conversion function performs data conversion between the system acquisition data 54 and the application usable data 52 through the intermediary of the universal data 53, thereby lowering dependency between the data structures of the application usable data 52 and the system acquisition data 54 in the data conversion function.

In the information processing apparatus 100 of the first embodiment of the present invention, since the system acquisition data conversion unit 632 and the application usable data conversion unit 622 are two separate units, the application can easily add or remove the application usable data conversion unit 622 corresponding to the application utilization information regardless of the data structure of the storage location storing the system acquisition data 54 and the data access procedure.

In the information processing apparatus 100 of the first embodiment of the present invention, the system acquisition data converter 63 is divided into the part (the system acquisition data conversion unit 632) dependent on the data structure of the system acquisition data 54 and the part (the storage data access unit 631) independent of the data structure of the system acquisition data 54, and therefore connection or disconnection of the storage location can be performed with the minimum changes (changes within the data structure dependent part).

Accordingly it is possible to provide the data conversion function that can easily respond to a data structure change between the system acquisition data 54 and the application usable data 52 (upon installing or uninstalling an application, or upon connecting to or disconnecting from a storage location).

As mentioned above in connection with FIGS. 2A and 2B, the image processing apparatus 200 (including the image forming apparatus) including the information processing apparatus 100 can provide the same advantages.

The storage locations used in the first embodiments are merely examples of data management locations storing system acquisition data acquired by the system as the application utilization information, and are not intended to limit the present invention.

Examples of a storage location include, in addition to SD Cards, memory cards such as SmartMedia (registered trademark), MemoryStick (registered trademark), MMC (MultiMedia card), and xD-Picture Card (registered trademark); external HDs; and an image processing apparatus 200 (including an image forming apparatus) having a data management function.

The above-described requirements about the configuration, the combinations of elements, and the like do not limit the present invention.

These requirements can be changed without departing from the scope of the invention and can be properly determined according to application purposes.

The present application is based on Japanese Priority Application No. 2006-275309 filed on Oct. 6, 2006, with the Japanese Patent Office, the entire contents of which are hereby incorporated by reference.

What is claimed is:

1. An information processing apparatus, comprising:
   a system acquisition data conversion unit that converts system acquisition data acquired as information for use by one or more applications installed in the information processing apparatus into universal data independent of a data structure of the system acquisition data and a data structure of application usable data, the application usable data being usable by said one or more applications: and
   an application usable data conversion unit that converts the universal data into the application usable data, the application usable data including
      basic data to be commonly used by plural of the applications; and
      extended data to be used by a specific one of the applications,
   wherein the extended data are added to the application usable data upon installation of the specific application and are deleted from the application usable data upon uninstallation of the specific application.

2. The information processing apparatus as claimed in claim 1, wherein the universal data include
   a string indicating an item name of an information item and an item value corresponding to the item name.

3. The information processing apparatus as claimed in claim 1, wherein the application usable data conversion unit includes
   a basic data conversion unit that converts the universal data corresponding to the basic data of the application usable data into the basic data; and
   an extended data conversion unit that converts the universal data corresponding to the extended data of the application usable data into the extended data.

4. The information processing apparatus as claimed in claim 3, wherein the extended data conversion unit is added to the application usable data conversion unit upon installation of the specific application and is removed from the application usable data upon uninstallation of the specific application.

5. The information processing apparatus as claimed in claim 1, further comprising:
   a data type determination unit that determines a data type of a storage location for storage of the system acquisition data.

6. The information processing apparatus as claimed in claim 5, further comprising:
   a storage data access unit that accesses and manipulates the system acquisition data stored in the storage location.

7. The information processing apparatus as claimed in claim 5, wherein the data type determination unit specifies the application usable data conversion unit corresponding to information to be used by the application based on the determination result of the data type of the storage location for storage for the system acquisition data.

8. The information processing apparatus as claimed in claim 5, further comprising:
   a data management interface unit that defines a method and a format for exchanging data between the data type determination unit and the application.

9. The information processing apparatus as claimed in claim 5, further comprising:
   an application usable data converter management unit that adds, upon installation of the application, the corresponding data type determination unit and application usable data conversion unit and removes, upon uninstallation of the application, the corresponding data type determination unit and application usable data conversion unit.

10. The information processing apparatus as claimed in claim 1, wherein the application usable data converter management unit adds, upon addition of a storage location for storage of the system acquisition data, the corresponding system acquisition data conversion unit and removes, upon removal of a storage location, the corresponding system acquisition data conversion unit.

11. A data conversion method, comprising:
   a system acquisition data acquisition data converting step of converting system acquisition data acquired as information for use by an application into universal data independent of a data structure of the system acquisition data and a data structure of application usable data, the application usable data being usable by the application; and
   an application usable data converting step of converting the universal data into the application usable data, the application usable data including
      basic data to be commonly used by plural of the applications: and
      extended data to be used by a specific one of the applications, wherein the extended data are added to the application usable data upon installation of the specific application and are deleted from the application usable data upon uninstallation of the specific application.

12. A computer-readable medium storing a data conversion program for causing a computer to function as:
   a system acquisition data conversion unit that converts system acquisition data acquired as information for use by an application into universal data independent of a data structure of the system acquisition data and a data structure of application usable data, the application usable data being usable by the application; and
   an application usable data conversion unit that converts the universal data into the application usable data, the application usable data including
      basic data to be commonly used by plural of the applications; and
      extended data to be used by a specific one of the applications, wherein the extended data are added to the application usable data upon installation of the specific application and are deleted from the application usable data upon uninstallation of the specific application.

* * * * *